(12) United States Patent
Tsuchibuchi et al.

(10) Patent No.: US 10,682,657 B2
(45) Date of Patent: Jun. 16, 2020

(54) ADHESIVE SHEET AND PRODUCTION METHOD FOR ADHESIVE SHEET

(71) Applicant: LINTEC CORPORATION, Itabashi-ku (JP)

(72) Inventors: Koji Tsuchibuchi, Kashiwa (JP); Kazue Uemura, Tsukubamirai (JP); Kiichiro Kato, Saitama (JP)

(73) Assignee: LINTEC CORPORATION, Itabashi-ku (JP)

( * ) Notice: Subject to any disclaimer, the term of this patent is extended or adjusted under 35 U.S.C. 154(b) by 45 days.

(21) Appl. No.: 15/763,185

(22) PCT Filed: Sep. 27, 2016

(86) PCT No.: PCT/JP2016/078534
§ 371 (c)(1),
(2) Date: Mar. 26, 2018

(87) PCT Pub. No.: WO2017/057409
PCT Pub. Date: Apr. 6, 2017

(65) Prior Publication Data
US 2018/0264489 A1   Sep. 20, 2018

(30) Foreign Application Priority Data
Sep. 28, 2015   (JP) .................................. 2015-190515

(51) Int. Cl.
*B32B 27/00*   (2006.01)
*B32B 3/30*   (2006.01)
(Continued)

(52) U.S. Cl.
CPC .................. *B05B 5/10* (2013.01); *B05D 7/24* (2013.01); *B32B 3/30* (2013.01); *B32B 27/00* (2013.01);
(Continued)

(58) Field of Classification Search
CPC ... C09J 133/08; C09J 7/02; C09J 7/385; C09J 7/255; C09J 7/203; C09J 7/22; C09J 7/38;
(Continued)

(56) References Cited

U.S. PATENT DOCUMENTS 6,294,250 B1 *   9/2001   Date .......................... C09J 7/50
428/353
9,240,131 B2 *   1/2016   Onderisin .............. B31D 1/027
(Continued)

FOREIGN PATENT DOCUMENTS

CN   101583683 A   11/2009
CN   104704074 A   6/2015
(Continued)

OTHER PUBLICATIONS

Extended European Search Report dated May 9, 2019 in European Patent Application No. 16851580.7, 12 pages.
(Continued)

*Primary Examiner* — Patricia L. Nordmeyer
(74) *Attorney, Agent, or Firm* — Oblon, McClelland, Maier & Neustadt, L.L.P.

(57) ABSTRACT

Provided are a pressure sensitive adhesive sheet including, on a substrate, a resin layer containing a resin which is a resin layer containing a resin part (X) containing a resin as a main component and a particle part (Y) consisting of fine particles, at least a surface (α) of the resin layer on the side opposite to the side thereof on which the substrate is provided, having pressure sensitive adhesiveness, wherein a bending stress coefficient k in the MD direction of the substrate is 20 N·mm or less, a 10% elongation strength in the MD direction thereof is 260 N/15 mm or less, and concave portions satisfying specified requirements are
(Continued)

included on the surface (α) of the resin layer; and a method for producing the pressure sensitive adhesive sheet.

18 Claims, 9 Drawing Sheets

(51) Int. Cl.

| | | |
|---|---|---|
| C09J 133/08 | (2006.01) | |
| C09J 7/38 | (2018.01) | |
| C09J 7/20 | (2018.01) | |
| C08K 3/36 | (2006.01) | |
| C08K 3/013 | (2018.01) | |
| B05B 5/10 | (2006.01) | |
| C09J 11/04 | (2006.01) | |
| C09J 201/00 | (2006.01) | |
| C09J 175/04 | (2006.01) | |
| C09J 133/02 | (2006.01) | |
| C09J 5/00 | (2006.01) | |
| B05D 7/24 | (2006.01) | |
| C08K 3/00 | (2018.01) | |
| C08K 3/34 | (2006.01) | |
| C08K 7/00 | (2006.01) | |

(52) U.S. Cl.
CPC . *C09J 5/00* (2013.01); *C09J 7/20* (2018.01); *C09J 7/38* (2018.01); *C09J 11/04* (2013.01); *C09J 133/02* (2013.01); *C09J 133/08* (2013.01); *C09J 175/04* (2013.01); *C09J 201/00* (2013.01); *C08G 2170/40* (2013.01); *C08K 3/00* (2013.01); *C08K 3/013* (2018.01); *C08K 3/34* (2013.01); *C08K 3/346* (2013.01); *C08K 3/36* (2013.01); *C08K 7/00* (2013.01); *C09J 2201/36* (2013.01); *C09J 2201/606* (2013.01); *C09J 2205/102* (2013.01); *C09J 2421/00* (2013.01); *C09J 2433/00* (2013.01); *C09J 2467/006* (2013.01); *C09J 2475/00* (2013.01)

(58) Field of Classification Search
CPC . C09J 7/10; C09J 7/0207; C09J 7/0217; C09J 7/0253; C09J 7/026; C09J 7/0285; C09J 7/20; C09J 5/00; C09J 11/04; C09J 201/00; C09J 2201/16; C09J 2201/28; C09J 2201/36; C09J 2201/606; C09J 2205/10; C09J 2205/102; C09J 2205/114; C09J 2400/163; C09J 2421/00; C09J 2433/00; C09J 2467/006; C09J 2475/00; C09J 2483/005; B05D 1/36; B05D 3/108; B05D 5/00; C08K 3/346; C08K 3/36; C08K 3/34; C08K 3/013; C08K 7/00; C08K 2201/003

See application file for complete search history.

(56) References Cited

U.S. PATENT DOCUMENTS

| | | |
|---|---|---|
| 2009/0136711 A1 | 5/2009 | Tomino et al. |
| 2017/0174943 A1 | 6/2017 | Kato et al. |
| 2017/0174944 A1 | 6/2017 | Kato et al. |
| 2017/0174945 A1 | 6/2017 | Saito et al. |
| 2017/0174946 A1 | 6/2017 | Uemura et al. |
| 2017/0174947 A1 | 6/2017 | Kato et al. |
| 2017/0183544 A1 | 6/2017 | Kato et al. |
| 2017/0210949 A1 | 7/2017 | Kawada et al. |
| 2018/0171182 A1 | 6/2018 | Uemura et al. |

FOREIGN PATENT DOCUMENTS

| | | |
|---|---|---|
| JP | 2001-507732 A | 6/2001 |
| JP | 2002-275433 A | 9/2002 |
| JP | 2004-115766 A | 4/2004 |
| JP | 2009-35609 A | 2/2009 |
| JP | 2012-197332 A | 10/2012 |
| WO | 2007/015343 A1 | 2/2007 |
| WO | WO 2015/152347 A1 | 10/2015 |
| WO | WO 2015/152352 A1 | 10/2015 |
| WO | WO 2017/057407 A1 | 4/2017 |

OTHER PUBLICATIONS

International Search Report dated Dec. 13, 2016 in PCT/JP2016/078534 filed Sep. 27, 2016.

\* cited by examiner

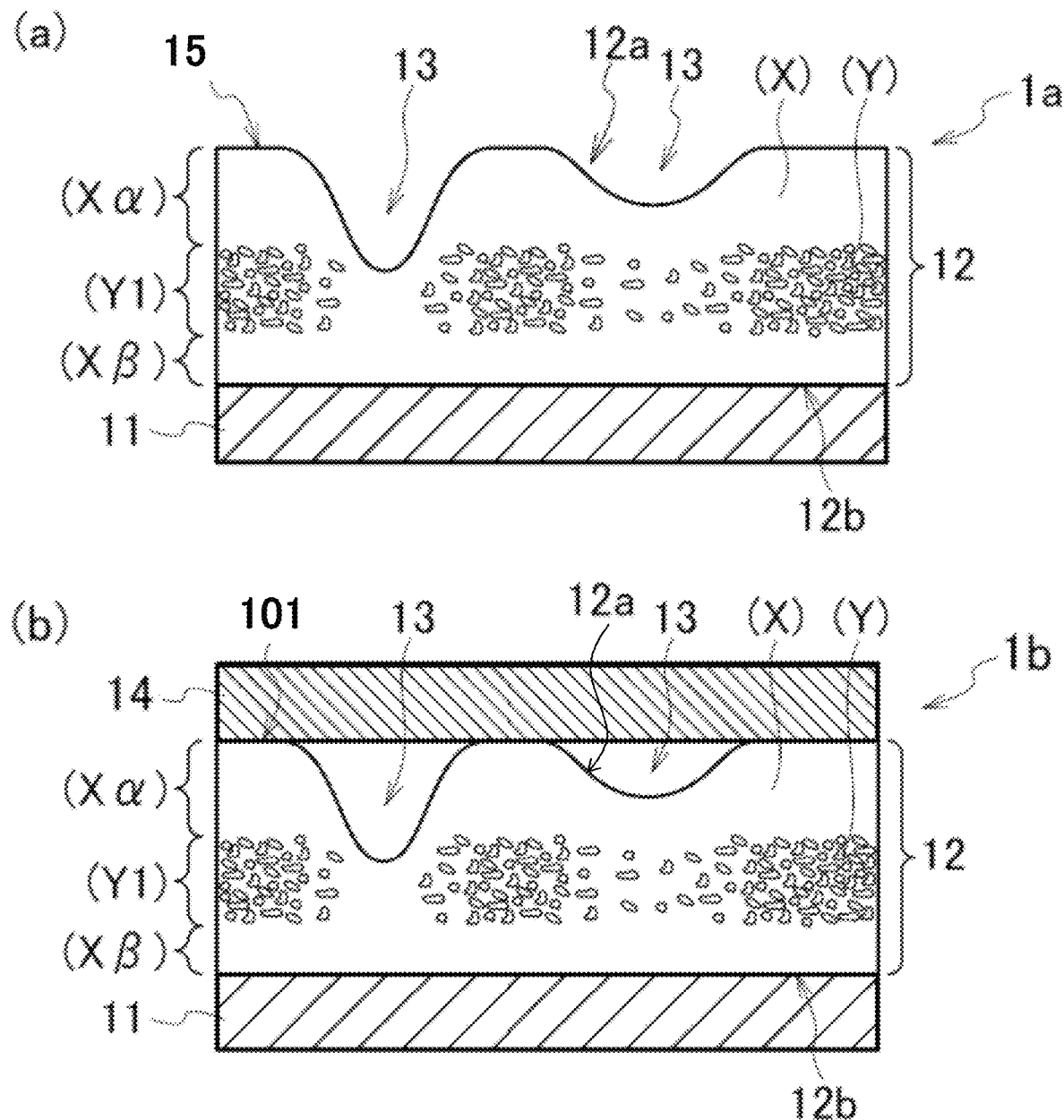
[Fig. 1]

[Fig. 2]
(a)
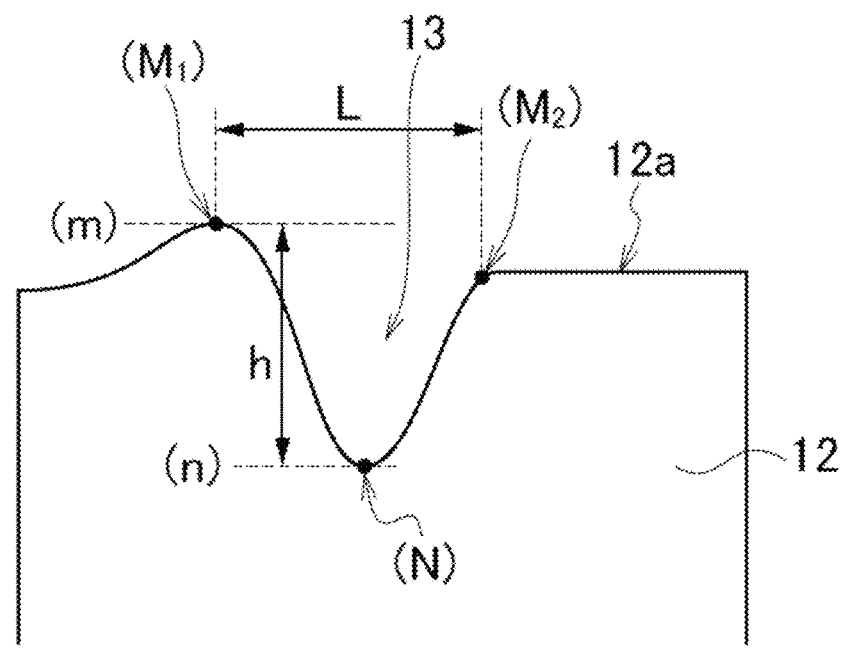
(b)
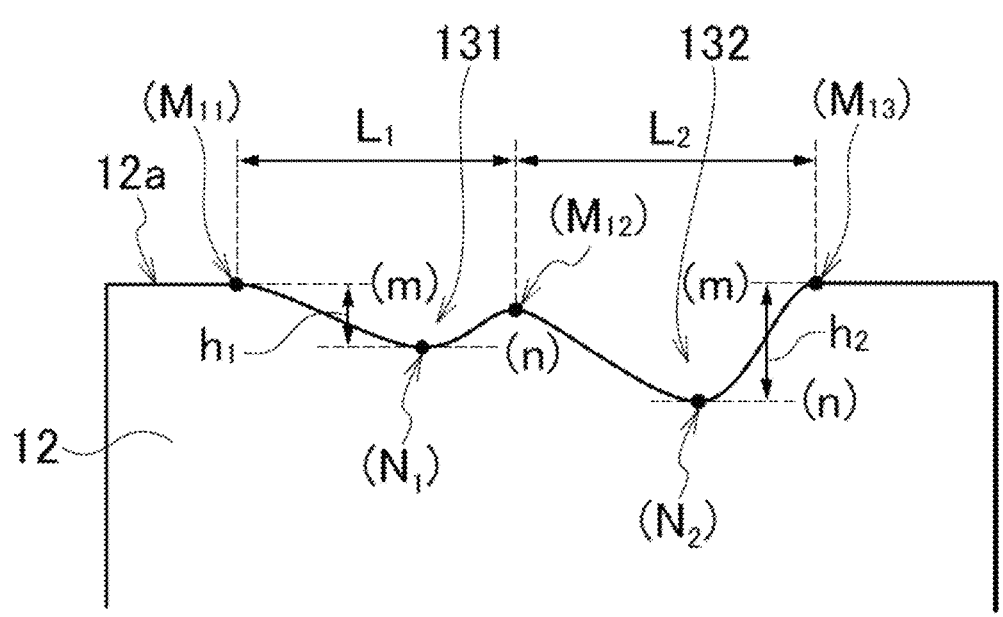

[Fig. 3]
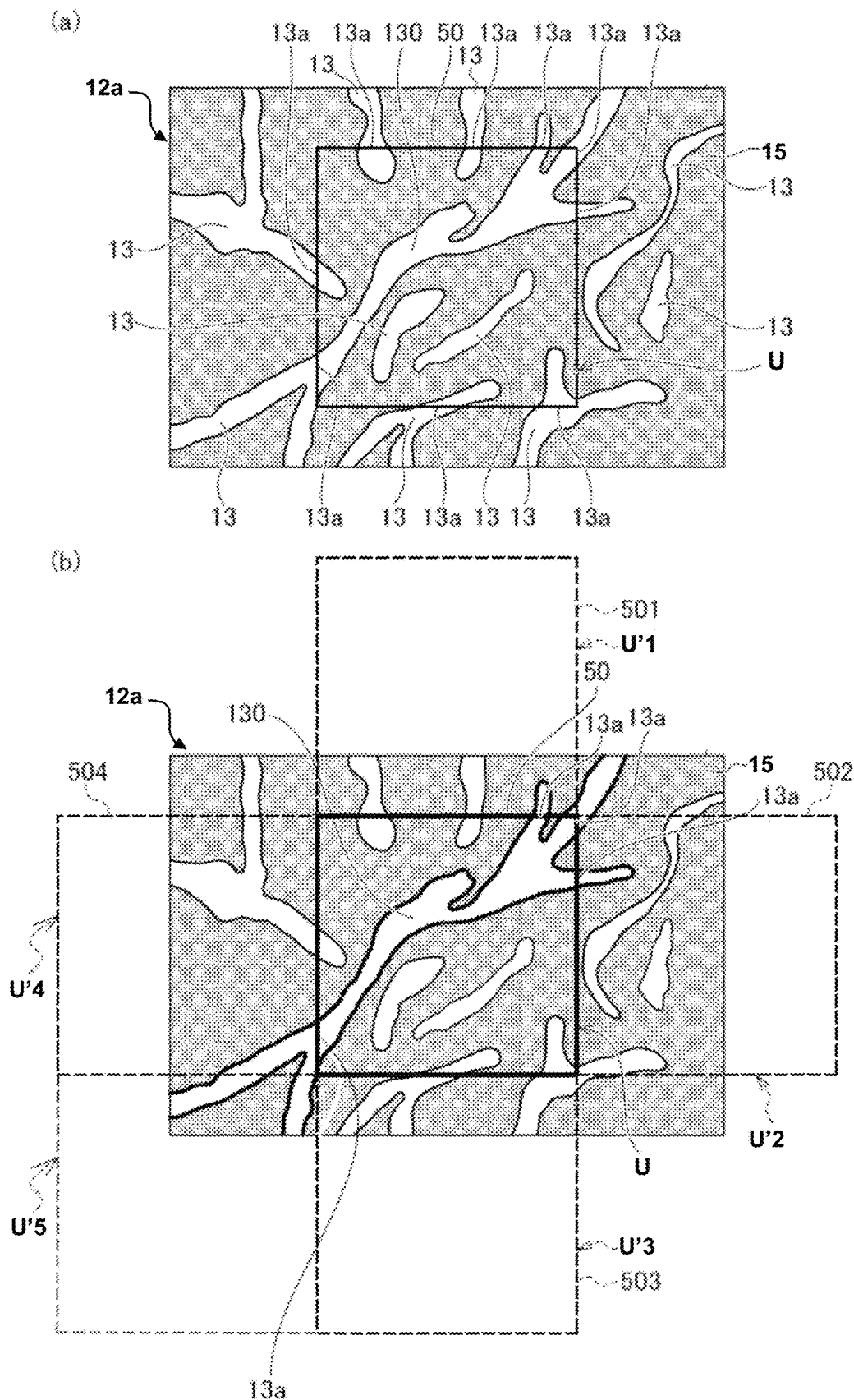

[Fig. 4]
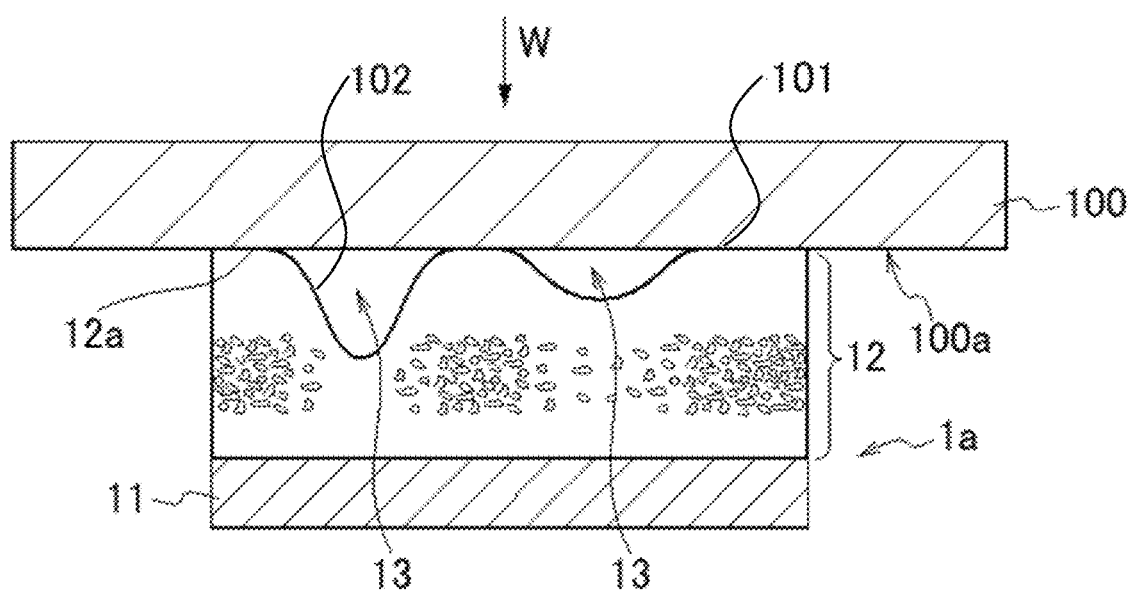

[Fig. 5]
(a)
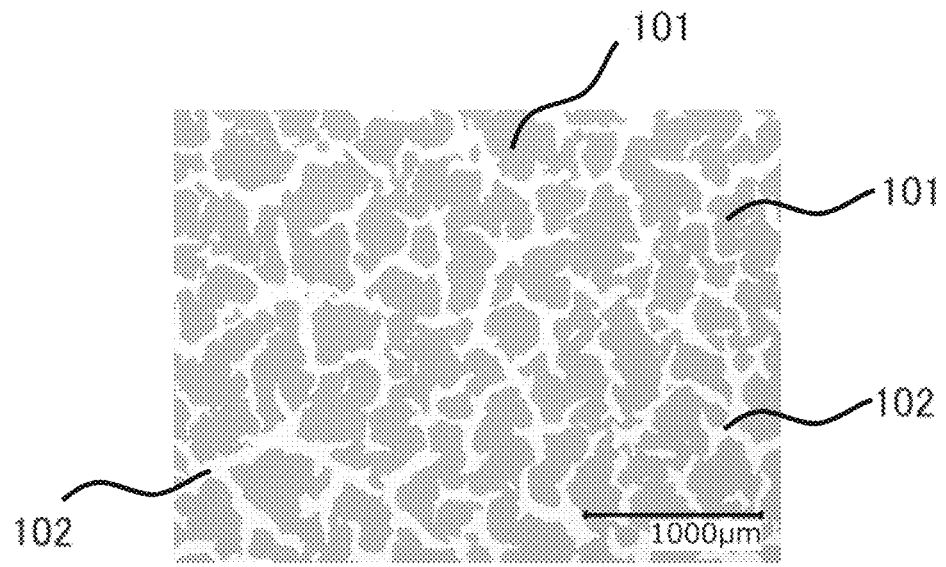
(b)
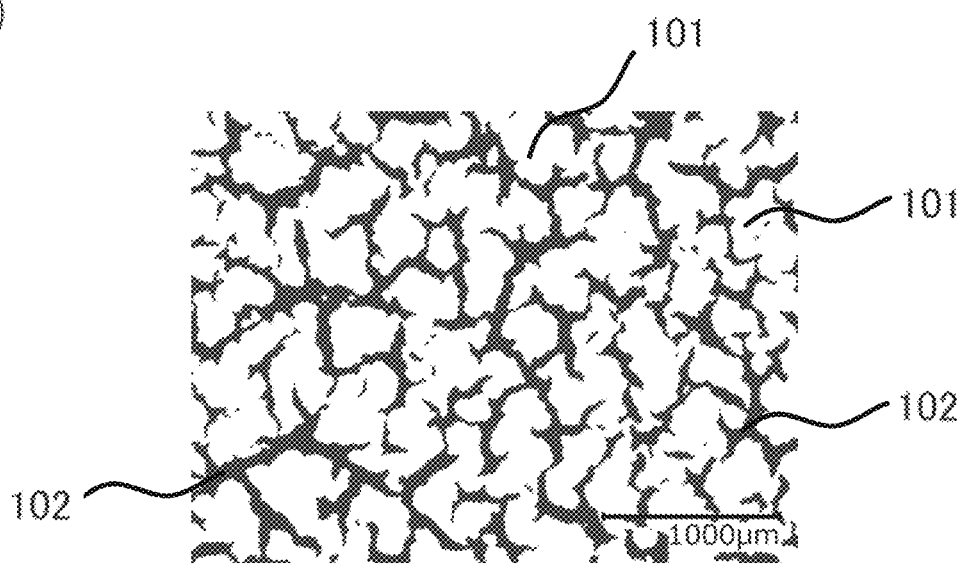

[Fig. 6]
(a)
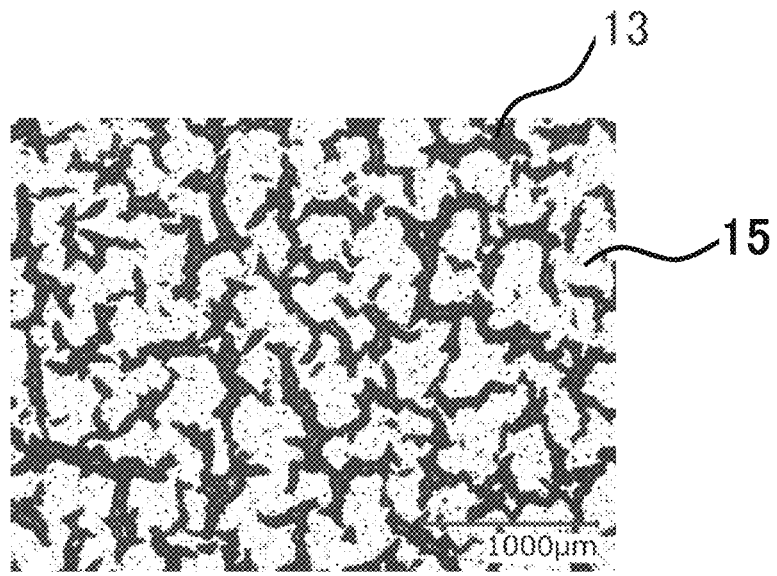
(b)
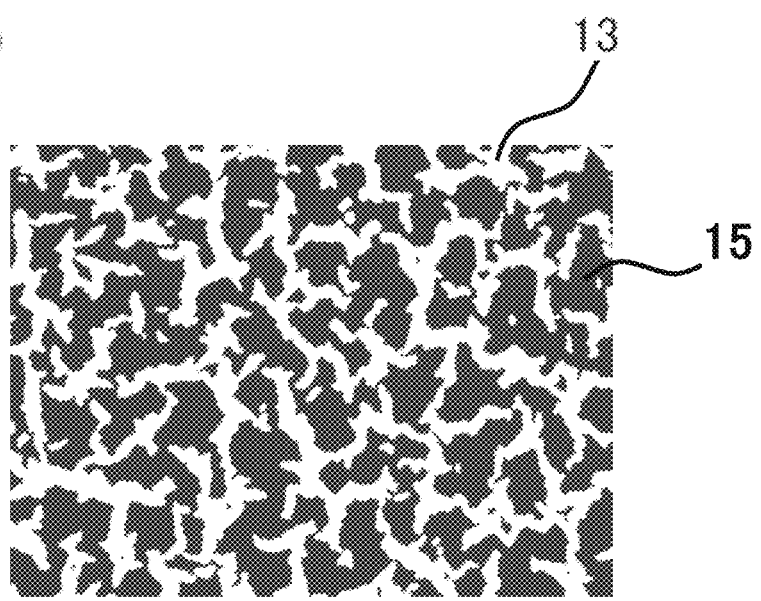

[Fig. 7]
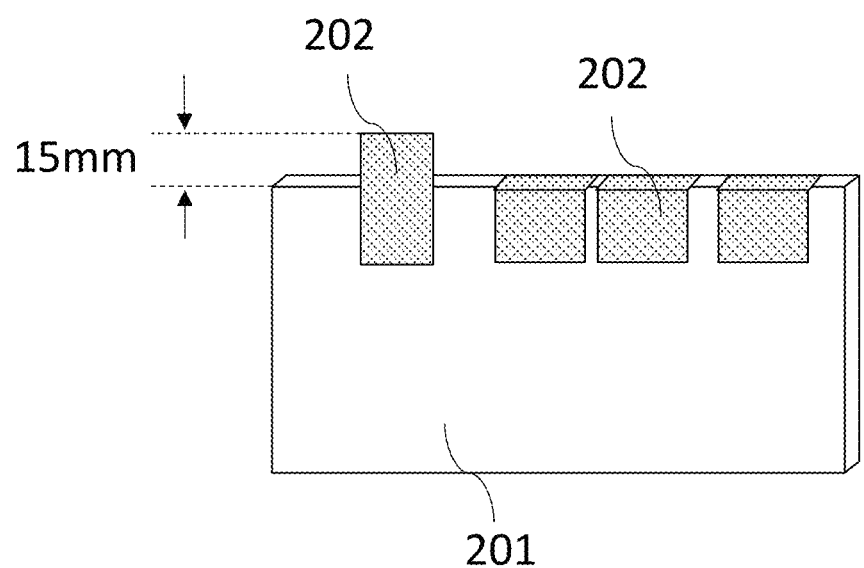

[Fig. 8]
(a)
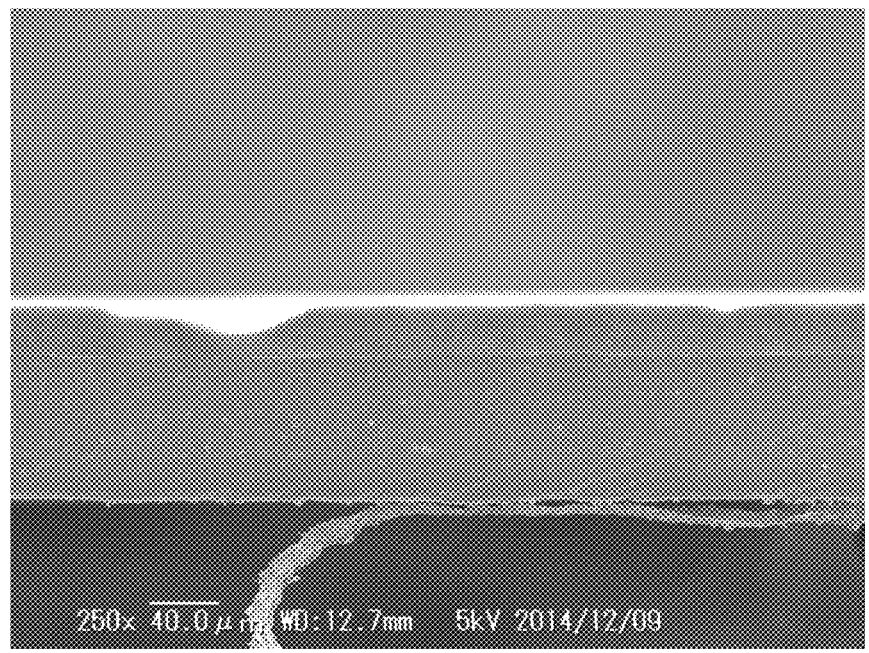
(b)
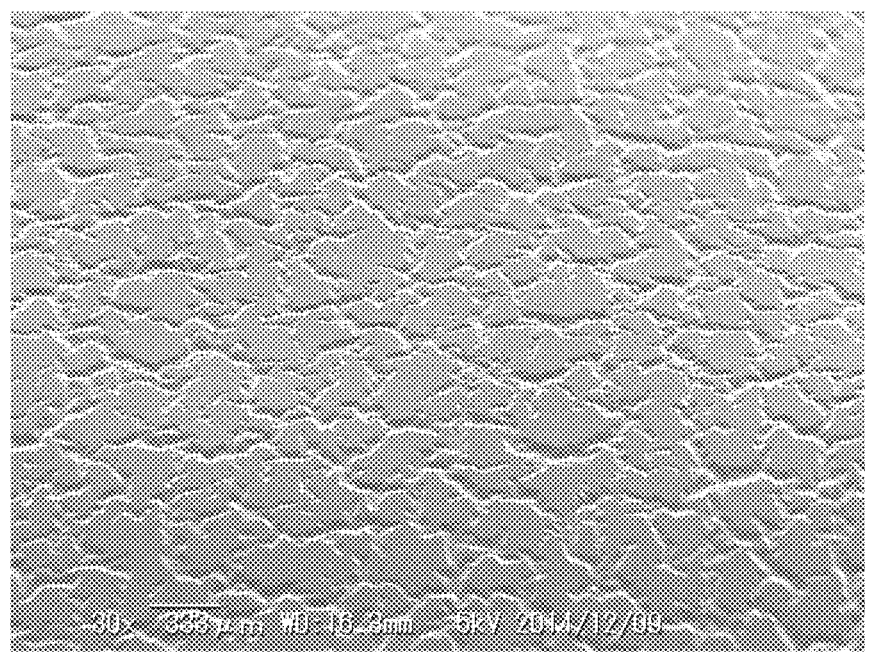

[Fig. 9]
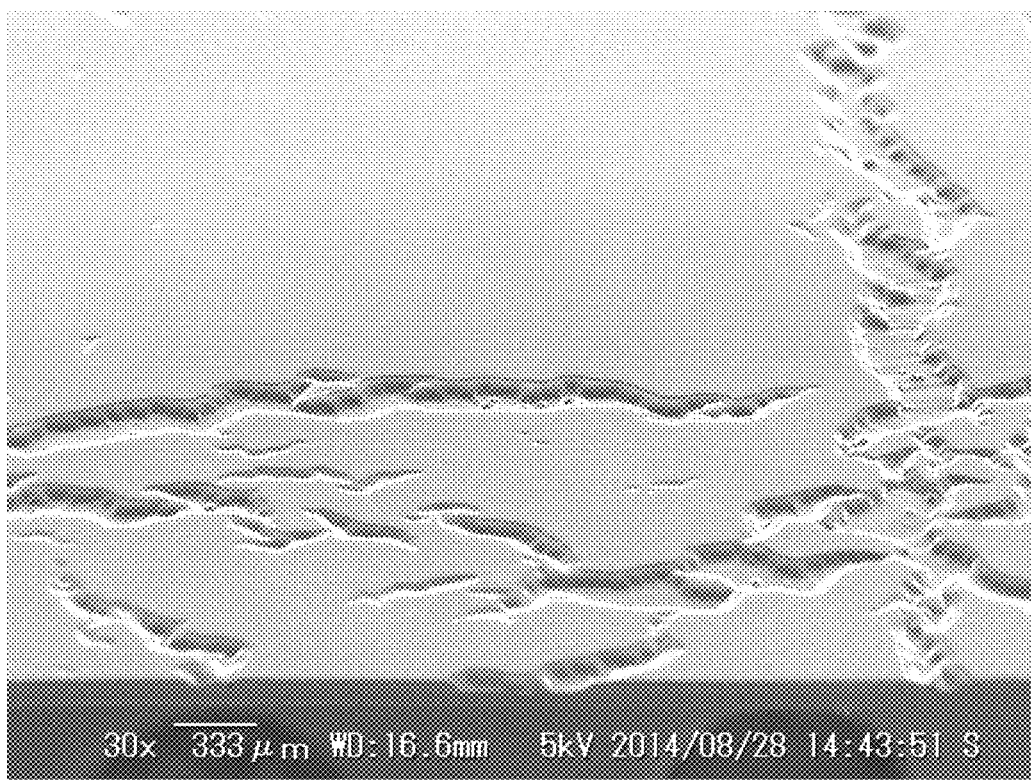

ADHESIVE SHEET AND PRODUCTION METHOD FOR ADHESIVE SHEET

TECHNICAL FIELD

The present invention relates to a pressure sensitive adhesive sheet and a method for producing a pressure sensitive adhesive sheet.

BACKGROUND ART

A general pressure sensitive adhesive sheet is constituted of a substrate, a pressure sensitive adhesive layer formed on the substrate, and a release material provided on the pressure sensitive adhesive layer depending on necessity, and in use, after removing the release material in the case where the release material is provided, the general pressure sensitive adhesive sheet is attached to an adherend by bringing the pressure sensitive adhesive layer into contact therewith.

A pressure sensitive adhesive sheet having a large attaching area, which may be used for identification or decoration, masking for painting, surface protection of a metal plate or the like, and the like, has a problem that in attaching the sheet to an adherend, air accumulation is liable to occur between the pressure sensitive adhesive layer and the adherend, and the portion with the air accumulation is recognized as "blister", so as to prevent the pressure sensitive adhesive sheet from being attached cleanly to the adherend.

For solving the problem, for example, PTL 1 describes a pressure sensitive adhesive sheet having grooves with a specified shape that are disposed artificially in a prescribed pattern on the surface of the pressure sensitive adhesive layer by making a release material having a fine emboss pattern into contact with the surface of the pressure sensitive adhesive layer.

There is described that, by using the pressure sensitive adhesive sheet, it is possible to escape the "air accumulation" formed on attaching to an adherend, to the exterior through the grooves formed artificially on the surface of the pressure sensitive adhesive layer.

CITATION LIST

Patent Literature

PTL 1: JP 2001-507732 A

SUMMARY OF INVENTION

Technical Problem

However, in the pressure sensitive adhesive sheet having a pressure sensitive adhesive layer in which grooves having a specified shape are disposed, as described in PTL 1, etc., there is involved such a problem that if the width of the groove is narrow, the air hardly comes out, whereas if the width of the groove is wide, the surface substrate is dented, so that the appearance is inferior (hereinafter also referred to simply as "poor appearance").

Such a problem is considered to be a problem especially in pressure sensitive adhesive sheets to be used for the purpose for painting alternation, marking of signs, etc., or the purpose of painting, improvement in appearance, etc. of vehicles, such as automobiles, etc. Then, an adherend to which the pressure sensitive adhesive sheet is attached is not limited to one having a single flat face. Accordingly, in many cases, the pressure sensitive adhesive sheet is attached while being folded in conformity with the shape of the adherend. In the case where such a pressure sensitive adhesive sheet is attached while being folded, there is caused such a problem that a gap is generated between the pressure sensitive adhesive sheet and the adherend (hereinafter also referred to simply as "lifting"), and moreover, the pressure sensitive adhesive sheet peels off from the adherend (hereinafter also referred to simply as "peeling"). In consequence, the pressure sensitive adhesive sheet to be used for the foregoing applications is required to not only inhibit the aforementioned poor appearance but also have excellent folding attaching property.

In view of the aforementioned circumstances, the present invention has been made, and an object thereof is to provide a pressure sensitive adhesive sheet which not only has excellent air escape property such that the air accumulation possibly generated on attaching to an adherend can be readily removed but also is free from poor appearance and has excellent folding attaching property; and a method for producing the pressure sensitive adhesive sheet.

Solution to Problem

The present inventors have found that a pressure sensitive adhesive sheet including, on a specified substrate, a resin layer containing a resin part containing a resin as a main component and a particle part consisting of fine particles and having plural concave portions having a height difference of 0.5 μm or more at maximum in a specified region on a surface of the resin layer, one or more of the concave portions being existent in a narrower specified region, is able to solve the aforementioned problem, thereby leading to accomplishment of the present invention.

Specifically, the present invention provides the following [1] to [23].

[1] A pressure sensitive adhesive sheet including, on a substrate, a resin layer containing a resin which is a resin layer containing a resin part (X) containing a resin as a main component and a particle part (Y) consisting of fine particles, at least a surface (α) of the resin layer on the side opposite to the side thereof on which the substrate is provided having pressure sensitive adhesiveness, wherein a bending stress coefficient k in the MD direction of the substrate is 20 N·mm or less, and a 10% elongation strength in the MD direction thereof is 260 N/15 mm or less, plural concave portions having a height difference of 0.5 μm or more at maximum exist in a region (P) surrounded by a square having an edge length of 5 mm that is arbitrarily selected on the surface (α) of the resin layer, and one or more of the concave portions exist in a region (U) surrounded by a square having an edge length of 600 μm that is arbitrarily selected on the surface (α).

[2] The pressure sensitive adhesive sheet as set forth in the above [1], wherein a Young's modulus in the MD direction of the substrate is 7,000 MPa or less.

[3] The pressure sensitive adhesive sheet as set forth in the above [2], wherein the Young's modulus in the MD direction of the substrate is 3,000 MPa or less.

[4] The pressure sensitive adhesive sheet as set forth in any of the above [1] to [3], wherein the 10% elongation strength in the MD direction of the substrate is 50 N/15 mm or less.

[5] The pressure sensitive adhesive sheet as set forth in any of the above [1] to [4], wherein the fine particles are one or more selected from silica particles, metal oxide particles, and smectite.

[6] The pressure sensitive adhesive sheet as set forth in any of the above [1] to [5], wherein a mass retention rate after heating the resin layer at 800° C. for 30 minutes is 3 to 90% by mass.

[7] The pressure sensitive adhesive sheet as set forth in any of the above [1] to [6], wherein a volume average secondary particle diameter of the fine particles constituting the particle part (Y) is 1 to 70% of the thickness of the resin layer.

[8] The pressure sensitive adhesive sheet as set forth in any of the above [1] to [7], wherein a volume average secondary particle diameter of the fine particles is 0.5 to m.

[9] The pressure sensitive adhesive sheet as set forth in any of the above [1] to [8], wherein the resin layer is a multilayer structure in which a layer (Xβ) mainly containing the resin part (X), a layer (Y1) containing the particle part (Y) in an amount of 15% by mass or more, and a layer (Xα) mainly containing the resin part (X) are laminated in this order from the side on which the substrate is provided.

[10] The pressure sensitive adhesive sheet as set forth in any of the above [1] to [9], wherein the concave portions are not one formed by transfer of an embossed pattern.

[11] The pressure sensitive adhesive sheet as set forth in any of the above [1] to [10], wherein the shape of the concave portions is irregular.

[12] The pressure sensitive adhesive sheet as set forth in any of the above [1] to [11], wherein in a planar view of the surface (α) of the resin layer on attaching the surface (α) to an adherend, in a region (Vs) having an area of 8.93 mm$^2$ surrounded by a rectangle of 3.45 mm in long side and 2.59 mm in short side that is arbitrarily selected on the surface (α), a proportion of the total area of the concave portions having a shape different from other concave portions existing in the region (Vs) is 95.0% or more relative to the whole area of all of the concave portions existing in the region (Vs).

[13] The pressure sensitive adhesive sheet as set forth in any of the above [1] to [12], wherein a shape of a flat face existing on the surface (α) observed from the side of the surface (α) of the resin layer is irregular.

[14] The pressure sensitive adhesive sheet as set forth in any of the above [1] to [13], wherein on attaching the surface (α) of the resin layer to the adherend, an area ratio of the attached face to an adherend is 10 to 95%.

[15] The pressure sensitive adhesive sheet as set forth in any of the above [1] to [14], wherein in a planar view of the surface (α) of the resin layer, the whole area of flat faces existing in a region (V) having an area of 8.93 mm$^2$ surrounded by a rectangle of 3.45 mm in long side and 2.59 mm in short side that is arbitrarily selected on the surface (α) is 1.0 mm$^2$ or more.

[16] The pressure sensitive adhesive sheet as set forth in any of the above [1] to [15], wherein in a planar view of the surface (α) of the resin layer, at least one flat face having such an area that a region surrounded by a circle having a diameter of 100 μm is selectable exists in a region (V) having an area of 8.93 mm$^2$ surrounded by a rectangle of 3.45 mm in long side and 2.59 mm in short side.

[17] The pressure sensitive adhesive sheet as set forth in any of the above [1] to [16], wherein in a planar view of the surface (α) of the resin layer, at least one flat face having an area of 0.1 mm$^2$ or more exists in a region (V) having an area of 8.93 mm$^2$ surrounded by a rectangle of 3.45 mm in long side and 2.59 mm in short side.

[18] The pressure sensitive adhesive sheet as set forth in any of the above [1] to [17], wherein the resin contains a pressure sensitive adhesive resin.

[19] The pressure sensitive adhesive sheet as set forth in any of the above [1] to [18], wherein on attaching the surface (α) of the resin layer to an adherend, the shape of the concave portions is not confirmed through visual inspection from the side of the substrate of the pressure sensitive adhesive sheet.

[20] The pressure sensitive adhesive sheet as set forth in any of the above [1] to [19], which is used for painting-alternate tapes, marking films, or vehicle attachment tapes.

[21] A method for producing the pressure sensitive adhesive sheet as set forth in any of the above [1] to [20], which includes at least the following steps (1) and (2):

step (1): a step of forming a coating film (x') formed by a composition (x) containing a resin as a main component and a coating film (y') formed by a composition (y) containing the fine particles in an amount of 15% by mass or more; and step (2): a step of drying the coating film (x') and the coating film (y') formed in the step (1) simultaneously.

[22] The method for producing the pressure sensitive adhesive sheet as set forth in the above [21], which includes at least the following steps (1A) and (2A):

step (1A): a step of forming, on a release material or a substrate having a bending stress coefficient k in the MD direction of 20 N·mm or less and a 10% elongation strength in the MD direction of 260 N/15 mm or less, a coating film (xβ') formed by a composition (xβ) containing a resin as a main component, a coating film (y') formed by a composition (y) containing the fine particles in an amount of 15% by mass or more, and a coating film (xα') formed by a composition (xα) containing a resin as a main component, by laminating in this order; and step (2A): a step of drying the coating film (xβ'), the coating film (y'), and the coating film (xα') formed in the step (1A) simultaneously.

[23] The method for producing the pressure sensitive adhesive sheet as set forth in the above [21], which includes at least the following steps (1B) and (2B):

step (1B): a step of forming, on a layer (XP) mainly containing the resin part (X) that is provided on a release material or a substrate having a bending stress coefficient k in the MD direction of 20 N·mm or less and a 10% elongation strength in the MD direction of 260 N/15 mm or less, a coating film (y') formed by a composition (y) containing the fine particles in an amount of 15% by mass or more and a coating film (xα') formed by a composition (xα) containing a resin as a main component, by laminating in this order; and step (2B): a step of drying the coating film (y') and the coating film (xα') formed in the step (1B) simultaneously.

Advantageous Effects of Invention

In accordance with the present invention, it is possible to provide a pressure sensitive adhesive sheet which not only has excellent air escape property such that the air accumulation possibly generated on attaching to an adherend can be readily removed but also is free from poor appearance and has excellent folding attaching property.

BRIEF DESCRIPTION OF DRAWINGS

FIG. 1 is a schematic cross sectional view showing an example of the configuration of the pressure sensitive adhesive sheet of the present invention.

FIG. 2 is a schematic cross sectional view showing an example of a shape on the side of the surface (α) of the resin layer which the pressure sensitive adhesive sheet of the present invention has.

FIG. 3 is a schematic plan view showing an example of the surface (α) of the resin layer which the pressure sensitive adhesive sheet of the present invention has.

FIG. 4 is a schematic cross sectional plan view of the pressure sensitive adhesive sheet showing an example of the configuration on attaching the surface (α) of the resin layer and a smooth face of a translucent adherend having the smooth face to each other.

FIG. 5 is an image of a region (Vs) resulting from acquiring a digital image on attaching the surface (α) of the resin layer of the pressure sensitive adhesive sheet produced in Example 1 and a smooth face of a translucent adherend having the smooth face to each other and observing the surface (α) from the side of the translucent adherend with a digital microscope, the region (Vs) having an area of 8.93 mm$^2$ surrounded by a rectangle of 3.45 mm in long side and 2.59 mm in short side that is arbitrarily selected on the digital image (FIG. 5(a)); and a binarized image obtained by subjecting the foregoing image to image processing (binarization processing) (FIG. 5(b)).

FIG. 6 is an image of a region (V) resulting from acquiring a digital image on observing the surface (α) of the resin layer of the pressure sensitive adhesive sheet produced in Example 1 with a digital microscope, the region (V) having an area of 8.93 mm$^2$ surrounded by a rectangle of 3.45 mm in long side and 2.59 mm in short side that is arbitrarily selected on the digital image (FIG. 6(a)); and a binarized image obtained by subjecting the foregoing image to image processing (binarization processing) (FIG. 6(b)).

FIG. 7 is a schematic view showing a part of a folding attaching property test performed in each of the Example and Comparative Example.

FIG. 8 is an image on observing the pressure sensitive adhesive sheet produced in Example 4 with a scanning electron microscope, in which FIG. 8(a) is a cross sectional image of the pressure sensitive adhesive sheet, and FIG. 8(b) is a perspective image of the surface (α) of the resin layer of the pressure sensitive adhesive sheet.

FIG. 9 is an image on observing the pressure sensitive adhesive sheet produced in Comparative Example 2 with a scanning electron microscope and is a perspective image of the surface (α) of the resin layer of the pressure sensitive adhesive sheet.

DESCRIPTION OF EMBODIMENTS

In the present invention, for example, an expression "YY containing a component XX as a main component" or an expression "YY mainly containing a component XX" means that "among the components contained in YY, a component having a largest content is the component XX". A specific content of the component XX in this expression is typically 50% by mass or more, and is preferably 65 to 100% by mass, more preferably 75 to 100% by mass, and still more preferably 85 to 100% by mass relative to the total amount (100% by mass) of YY.

In the present invention, for example, "(meth)acrylic acid" indicates both "acrylic acid" and "methacrylic acid", and the same is also applicable to other analogous terms.

In addition, the term "MD direction" of the substrate indicates the machine direction at the time of substrate molding (in the case of molding a sheet or film serving as the substrate in a lengthy manner, the direction parallel to the axis along the travelling direction of the sheet or film).

Furthermore, regarding a preferred numerical value range (for example, a range of content or the like), a lower limit and an upper limit that are expressed in stages can be combined each independently. For example, from an expression of "preferably 10 to 90, and more preferably 30 to 60", "the preferred lower limit (10)" and "the more preferred upper limit (60)" may be combined to be "10 to 60".

[Configuration of Pressure Sensitive Adhesive Sheet]

First of all, the configuration of the pressure sensitive adhesive sheet of the present invention is described.

The pressure sensitive adhesive sheet of the present invention is a pressure sensitive adhesive sheet including, on a substrate, a resin layer containing a resin part (X) containing a resin as a main component and a particle part (Y) consisting of fine particles and at least a surface (α) of the resin layer on the side opposite to the side thereof on which the substrate is provided, having pressure sensitive adhesiveness. A bending stress coefficient k in the MD direction of the substrate is 20 N·mm or less, and a 10% elongation strength in the MD direction thereof is 260 N/15 mm or less. Furthermore, plural concave portions having a height difference of 0.5 μm or more at maximum exist in a region (P) surrounded by a square having an edge length of 5 mm that is arbitrarily selected on the surface (α) of the resin layer. One or more of the concave portions exist in a region (U) surrounded by a square having an edge length of 600 μm that is arbitrarily selected on the surface (α).

FIG. 1 is a schematic cross sectional view showing an example of the configuration of the pressure sensitive adhesive sheet of the present invention and is an example of a configuration in which the pressure sensitive adhesive sheet has a resin layer composed of a three-layer structure containing a fine particle-containing layer.

As a specific configuration of the pressure sensitive adhesive sheet that is one embodiment of the present invention, for example, as shown in FIG. 1(a), there is exemplified a pressure sensitive adhesive sheet 1a having a resin layer 12 on a substrate 11.

In the pressure sensitive adhesive sheet that is one embodiment of the present invention, at least a surface (α) 12a of the resin layer 12 on the side opposite to the side on which the substrate 11 is provided (hereinafter also referred to simply as "surface (α)") has pressure sensitive adhesiveness.

Accordingly, from the viewpoint of handleability, the pressure sensitive adhesive sheet that is one embodiment of the present invention preferably has a configuration of a pressure sensitive adhesive sheet 1b as shown in FIG. 1(b), wherein a release material 14 is further provided on the surface (α) 12a of the resin layer 12 in the pressure sensitive adhesive sheet 1a as shown in FIG. 1.

In the pressure sensitive adhesive sheet that is one embodiment of the present invention, a surface (β) 12b of the resin layer 12 on the side on which the substrate 11 is provided (hereinafter also referred to simply as "surface (β)") may also have pressure sensitive adhesiveness. When the surface (β) has also pressure sensitive adhesiveness, so far as the pressure sensitive adhesive sheet 1a or 2a shown in FIG. 1(a) or FIG. 1(b) is concerned, the adhesion between the resin layer 12 and the substrate 11 can be bettered.

The resin layer 12 which the pressure sensitive adhesive sheet of the present invention has is a layer containing a resin part (X) containing a resin as a main component and a particle part (Y) consisting of fine particles. When the particle part (Y) is contained in the resin layer 12, the shape stability can be maintained, and the air escape property can be maintained.

Regarding the configuration of distribution of the resin part (X) and the particle part (Y) in the resin layer 12, the resin part (X) and the particle part (Y) may be distributed almost evenly as one configuration, or as a different configuration, a site mainly containing the resin part (X) and a site mainly containing the particle part (Y) may be locally divided.

As shown in FIGS. 1(a) and 1(b), in the resin layer 12, the site where concave portions 13 are formed on the surface (α) may have such a distribution that the occupying ratio of the particle part (Y) is smaller than other parts, or the particle part (Y) may not partially exist.

As a suitable embodiment, the resin layer 12 may be a multilayer structure configured of two or more layers.

As the resin layer that is such a multilayer structure, for example, there is exemplified a resin layer having a multilayer structure formed by laminating a layer (Xβ) mainly containing the resin part (X), a layer (Y1) containing the particle part (Y) in an amount of 15% by mass or more, and a layer (Xα) mainly containing the resin part (X) in this order from the side on which the substrate is provided, like in the pressure sensitive adhesive sheet 1a or 1b in FIG. 1.

The configuration of the multilayer structure of the resin layer may also be a mixed layer configuration where the boundary between the two layers to be laminated cannot be discerned.

Namely, the configuration of the resin layer 12 which the pressure sensitive adhesive sheet 1a in FIG. 1 has may also be a mixed layer configuration where the boundary between the layer (Xβ) and the layer (Y1), and/or the boundary between the layer (Y1) and the layer (Xα) cannot be discerned.

The configuration of the resin layer that is the multilayer structure is hereunder described by reference to, as one example, the resin layer 12 configured of three layers of the layer (Xβ), the layer (Y1), and the layer (Xα), which the pressure sensitive adhesive sheet 1a in FIG. 1 has.

It is preferred that the layer (Y1) is formed in other layer than the outermost layer of the resin layer 12. In addition, the surface (α) is contained in other layer than the layer (Y1). When the surface (α) is contained in other layer than the layer (Y1), any concern that the pressure sensitive adhesiveness and the appearance are lowered, and the adherend is damaged is reduced.

Each of the aforementioned layer (Xα), the aforementioned layer (Y1), and the aforementioned layer (Xβ) may be either a single-layer body formed of a single composition or a multilayer body formed of two or more compositions.

In the aforementioned layer (Y1), it is preferred that a part where the fine particles are crowded in the horizontal direction of the substrate and a part where no fine particle exists intermittently exist, like in the pressure sensitive adhesive sheet 1a or 1b in FIG. 1.

The layer (Xβ) and the layer (Xα) are a layer mainly containing the resin part (X) but may also contain a particle part (Y). However, the content of the particle part (Y) in each of the layer (Xβ) and the layer (Xα) is independently less than 15% by mass relative to the total mass (100% by mass) of the layer (Xβ) or the layer (Xα) and is smaller than the content of the resin in the resin part (Xβ) or the layer (Xα).

Namely, with respect to the content of the particle part (Y), the layer (Xβ) and the layer (Xα) are distinguished from the layer (Y1).

The layer (Xβ) and the layer (Xα) may further have a void part (Z) as described later, in addition to the resin part (X) and the particle part (Y).

The content of the resin part (X) in each of the layer (Xβ) and the layer (Xα) is independently typically more than 85% by mass, preferably 87 to 100% by mass, more preferably 90 to 100% by mass, still more preferably 95 to 100% by mass, and yet still more preferably 100% by mass relative to the total mass (100% by mass) of the layer (Xβ) or the layer (Xα).

The aforementioned "content of the resin part (X)" means a total content of the components other than the fine particles, such as a resin, a tackifier, a crosslinking agent, an ordinary additive, etc., constituting the resin part (X) contained in the layer (Xβ) or the layer (Xα).

Though the content of the fine particles constituting the particle part (Y) in each of the layer (Xβ) and the layer (Xα) is independently less than 15% by mass, it is preferably 0 to 13% by mass, more preferably 0 to 10% by mass, still more preferably 0 to 5% by mass, and yet still more preferably 0% by mass, relative to the total mass (100% by mass) of the layer (Xβ) or the layer (Xα).

In the present invention, the "content of the fine particles in each of the layer (Xβ) and the layer (Xα)" may be considered to be the content of the fine particles in the total amount (100% by mass (but excluding a diluent solvent)) of the resin composition that is the forming material for the layer (Xβ) or the layer Xα).

The content of the resin in the layer (Xα) is typically 30 to 100% by mass, preferably 40 to 100% by mass, more preferably 50 to 100% by mass, and still more preferably 60 to 100% by mass relative to the total amount (100% by mass) of the layer (Xα).

Meanwhile, the content of the resin in the layer (Xβ) is typically 50 to 100% by mass, preferably 65 to 100% by mass, more preferably 75 to 100% by mass, and still more preferably 85 to 100% by mass relative to the total amount (100% by mass) of the layer (Xβ).

In the present invention, the "content of the resin in each of the layer (Xβ) and the layer (Xα)" may be considered to be the content of the resin in the total amount (100% by mass (but excluding a diluent solvent)) of the resin composition that is the forming material for the layer (Xβ) or the layer (Xα).

The layer (Y1) may be a layer formed of the particle part (Y) alone, may also be a layer containing the resin part (X) together with the particle part (Y), and may be a layer further having a void part (Z).

Though the content of the fine particles constituting the particle part (Y) in the layer (Y1) is typically 15% by mass or more, it is preferably 20 to 100% by mass, more preferably 25 to 90% by mass, still more preferably 30 to 85% by mass, and yet still more preferably 35 to 80% by mass, relative to the total mass (100% by mass) of the layer (Y1).

The content of the resin in the layer (Y1) is typically 0 to 85% by mass, preferably 1 to 80% by mass, more preferably 5 to 75% by mass, still more preferably 10 to 70% by mass, and yet still more preferably 20 to 65% by mass relative to the total mass (100% by mass) of the layer (Y1).

In the present invention, the "content of the fine particles in the layer (Y1)" and the "content of the resin in the layer (Y1)" may be considered to be each the content of the fine particles or the resin in the total amount (100% by mass (but excluding a diluent solvent)) of the resin composition that is the forming material for the layer (Y1).

In one embodiment of the present invention, the layer (Xα) is preferably a layer formed by a composition (xα) containing a resin and having a content of the fine particles of less than 15% by mass.

Similarly, the layer (Xβ) is preferably a layer formed by a composition (xβ) containing a resin and having a content of the fine particles of less than 15% by mass.

The aforementioned layer (Y1) is preferably a layer formed by a composition (y) containing 15% by mass or more (100% by mass at maximum) of the fine particles.

Suitable embodiments (containing components, contents, etc.) of the composition (xα), the composition (xβ), and the composition (y1) are those as described later.

In the pressure sensitive adhesive sheet of the present invention, the concave portions 13 exist on the surface (α) 12a of the resin layer 12, as shown in FIGS. 1(a) and 1(b).

The concave portions 13 existing on the surface (α) also play a role of air-discharge channel for removing outside the "air accumulation" to be generated on attaching the surface (α) of the resin layer of the pressure sensitive adhesive sheet of the present invention to an adherend.

The length of the concave portion 13 in a planar view of the concave portion 13 existing on the surface (α) is not particularly limited. Namely, the concave portion 13 includes one having a relatively long groove-like shape and one having a relatively short pit-like shape.

From the viewpoint of providing a pressure sensitive adhesive sheet having improved various characteristics, such as air escape property, appearance, pressure sensitive adhesion characteristics, etc., with a well balance, it is preferred that the concave portions on the surface (α) of the resin layer are not one formed by transfer of an embossed pattern which is formed by, for example, pressing a release material having an embossed pattern applied thereto against the surface of the resin layer, or the like.

In one embodiment of the present invention, from the viewpoint of providing a pressure sensitive adhesive sheet having improved various characteristics, such as air escape property, appearance, pressure sensitive adhesion characteristics, etc., with a well balance, it is preferred that the shape of the aforementioned concave portions is irregular.

Here, the wording "the shape of the concave portions is irregular" as referred to in the present invention means that the shape of the concave portions in a planar view or stereoscopic view does not have a regular shape, such as a figure capable of drawing a center of a circle, an oval, or the like, a polygon, etc., but refers to a shape in which no regularity is present in the form, and no similarity is found in individual shapes. Specifically, the shapes of a flat face 15 and the concave portions 13 as shown in FIG. 3 are corresponding thereto.

When the shape of the concave portion is irregular, a pressure sensitive adhesive sheet having improved various characteristics, such as air escape property, pressure sensitive adhesion characteristics, etc., with a well balance can be provided.

When plural irregular concave portions exist, even in the case where a pressure is applied from a fixed direction, and the shape of a part of the concave portions existing on the surface (α) collapses, the concave portions 13 or concave portions 130 in which the shape is maintained are easy to exist on the surface (α), and vanishing of an air escape channel can be prevented.

The "polygon" excluded from the irregular shape, as referred to herein, refers to a figure capable of drawing diagonal lines in the inside thereof (without being protruded outside) and being surrounded by straight lines in which the sum of interior angles is 180×n (degrees) (n is a natural number). The polygon also includes one in which an edge part thereof has a round-shaped curvature.

For judgement on whether or not "the shape of the concave portions on the surface (α) is irregular", in principle, the shape of the concave portions is observed through visual inspection or with a digital microscope (magnification: 30 to 100 times). When the shape of the concave portions in a planar view of the concave portions from the side of the surface (α) is judged to be irregular, it can also be considered that "the shape of the concave portions is irregular".

However, on the occasion of selecting 10 regions of the region (V) having an area of 8.93 mm² surrounded by a rectangle of 3.45 mm in long side and 2.59 mm in short side that is arbitrarily selected on the surface (α) and observing the shape of the concave portions existing in each of the regions (V) through visual inspection or in a planar view (a stereoscopic view as the need arises) from the side of the surface (α) with a digital microscope (magnification: 30 to 100 times), when in all of the selected ten regions, the shape of the concave portions existing in each region is judged to be irregular, it can also be considered that "the shape of the concave portions existing on the surface (α) of the resin layer is irregular".

In the case where the foregoing region (V) is larger than a photographable region with the digital microscope, an image resulting from connection of the plural images obtained by photographing the photographable regions adjoining each other may also be used as an image to be observed in the region (V) for the aforementioned judgement. In addition, it is preferred that the matter that the shape of the foregoing concave portions is irregular can be viewed through visual inspection from the side of the surface (α) of the resin layer.

In the description of the present specification, examples of the digital microscope which is used on observing various shapes include "Digital Microscope VHX-1000" and "Digital Microscope VHX-5000", all of which are a product name, manufactured by Keyence Corporation, and the like.

From the viewpoint of providing a pressure sensitive adhesive sheet with improved air escape property, it is preferred that the irregular shape of the concave portions can be viewed through visual inspection from the side of the exposed surface (α) of the resin layer. As shown in FIG. 1(b), in the pressure sensitive adhesive sheet 1b in which the release material 14 is further provided on the surface (α) 12a of the resin layer 12, it is preferred that the release material 14 is peeled, and the irregular shape of the concave portions can be viewed through visual inspection from the side of the exposed surface (α).

It is preferred that the aforementioned concave portions are formed through self-formation of the aforementioned resin layer.

In the present invention, the "self-formation" means a phenomenon of naturally forming a disorganized profile in a process of self-sustaining formation of a resin layer, and in more detail, means a phenomenon of naturally forming a disorganized profile in a process of self-sustaining formation of a resin layer by drying a coating film formed of a composition that is a forming material for a resin layer.

The shape of the concave portions thus formed through self-formation of the resin layer in this way may be controlled in some degree by controlling the drying condition or the kind and the content of components in the composition that is a forming material for the resin layer, but differ from grooves to be formed by transfer of an embossed pattern, and it may be said that "it is substantially impossible to reproduce exactly the same shape". Accordingly, it may be said that the concave portions formed through self-formation of the resin layer have an irregular shape. When the concave portions having an irregular shape are formed, the shape of the flat face also becomes irregular.

The process of formation of the concave portions formed through self-formation of the resin layer may be considered as follows.

First of all, at the time of forming a coating film made of the composition serving as a forming material for the resin layer, in the step of drying the coating film, a contraction stress develops inside the coating film, and in the part where the bonding force of the resin has attenuated, the coating film is cracked inside it. Then, it may be considered that the resin around the cracked part flows into the space temporarily formed by cracking, thereby forming the concave portions on the surface (α) of the resin layer.

It may be considered that when multilayer coating films that differ in the resin content are formed, and the multilayer coating films are then dried simultaneously, a contraction stress difference is generated inside the coating films when dried, whereby the coating film is liable to be cracked.

From the viewpoint of facilitating the formation of the concave portions, it is preferred to control the condition appropriately in consideration of the following matters. It may be considered that these matters act with each other in a complex form to facilitate the formation of the concave portions. In this connection, suitable embodiments of the respective matters for facilitating the formation of the concave portions are those as described in the corresponding sections as described later.

The kind, constituent monomers, the molecular weight, and the content of the resin contained in the composition that is the forming material for the coating film.

The kind of the crosslinking agent and the kind of the solvent contained in the composition that is the forming material for the coating film.

The viscosity and the solid concentration of the composition that is the forming material for the coating film.

The thickness of the coating film to be formed (when plural layers are formed, the thickness of each coating film).

The drying temperature and the drying time for the formed coating film.

In the formation of a pressure sensitive adhesive layer in an ordinary pressure sensitive adhesive sheet, for the purpose of forming the pressure sensitive adhesive layer having a flat surface, and the aforementioned matters are suitably set in many cases.

On the other hand, in the present invention, the above matters are so set that the concave portions capable of contributing toward an improvement of the air escape property of the pressure sensitive adhesive sheet can be formed, quite differing from those in the designing method for the pressure sensitive adhesive layer of an ordinary pressure sensitive adhesive sheet.

It is preferred that the aforementioned matters are suitably set in consideration of the flowability of the resin contained in the coating film to be formed, or the like.

For example, in the case where fine particles are contained in the composition, by controlling the viscosity of the coating film formed of a composition containing a large amount of fine particles to fall within a suitable range, it is possible to suitably prevent the formed coating film from being mixed with any other coating film (a coating film containing a large amount of the resin) while maintaining the predetermined flowability of the fine particles in the coating film. By such controlling, cracks are formed in the horizontal direction, so that there is tendency that the concave portions in the coating film containing a large amount of resin are readily formed.

As a result, it is possible to increase the occupying ratio of the concave portion to be formed on the surface (α) and to increase the proportion of the concave portions connecting to each other, thereby enabling a pressure sensitive adhesive sheet having a more superior air escape property to be provided.

Among the aforementioned matters, it is preferred to suitably control the kind, the constituent monomers, and the molecular weight of the resin as well as the resin content such that the resin contained in the coating film containing a large amount of the resin has a suitable viscoelasticity.

Namely, by suitably increasing the hardness of the coating film (the hardness to be determined by factors, such as the viscoelasticity of resin, the viscosity of the coating liquid, etc.), the contract stress of the resin part (X) increases to facilitate the formation of concave portions. When the hardness of the coating film is higher, the contraction stress becomes high to facilitate the formation of concave portions, but when the coating film is too hard, the coatability thereof is worsened. In addition, when the resin elasticity is increased too much, the pressure sensitive adhesive strength of the resin layer to be formed from the coating film tends to lower. In consideration of these points, it is preferred to suitably control the viscoelasticity of the resin.

In the case where fine particles are contained in the composition or the coating film, it may be considered that by suitably selecting the fine particles to make the dispersion condition appropriate, the degree of swelling of the thickness of the resin layer owing to the fine particles, and the self-forming power of the concave portions can be controlled, and as a result, the concave portions are readily formed on the surface (α).

Furthermore, in consideration of the crosslinking rate of the formed coating film (or the composition that is the forming material), it is preferred that the aforementioned matters are suitably set.

Namely, in the case where the crosslinking rate of the coating film is too fast, there is a concern that the coating film is cured before the concave portions are formed. In addition, the degree of cracking of the coating film and the size of the concave portions are affected.

The crosslinking rate of the coating film may be controlled by suitably defining the kind of the crosslinking agent and the kind of the solvent in the composition that is the forming material or by suitably setting the drying time and the drying temperature for the coating film.

It is preferred that the concave portions existing on the surface (α) of the resin layer which the pressure sensitive adhesive sheet of the present invention has do not have a predetermined pattern. Here, "predetermined pattern" means, when a shape of one concave portion is specifically noted, the shape to be a fixed repeating unit which the concave portion has.

As shown in FIGS. 1(a) and 1(b), the pressure sensitive adhesive sheet of the present invention has a plurality of the concave portions 13 on a surface (α) of the resin layer 12 on the side opposite to the side on which the substrate 11 is provided. The concave portions 13 existing on the surface (α) also play a role of air-discharge channel for removing outside the "air accumulation" to be formed on attaching the pressure sensitive adhesive sheet of the present invention to an adherend.

In the pressure sensitive adhesive sheet of the present invention, the surface (α) satisfies the following requirements (I) and (II).

Requirement (I): Plural concave portions having a height difference of 0.5 m or more at maximum exist in a region (P) surrounded by a square having an edge length of 5 mm that is arbitrarily selected on the surface (α).

Requirement (II): One or more of the aforementioned concave portions exist in a region (U) surrounded by a square having an edge length of 600 μm that is arbitrarily selected on the surface (α).

The aforementioned requirements (I) and (II) are hereunder described in detail.

<Requirement (I)>

FIG. 2 is a schematic cross sectional view showing an example of a shape on the side of the surface (α) of the resin layer which the pressure sensitive adhesive sheet of the present invention has.

Like the concave portion 13 shown in FIG. 2(a), the shape of an ordinary concave portion has two mountain parts ($M_1$) and ($M_2$) and a valley part (N). The "height difference" of the concave portion in the present invention means the length of the difference (h) between the highest position (m) of the two mountain parts ($M_1$) and ($M_2$) (in FIG. 2(a), the maximum point of the mountain part ($M_1$)) and the lowest position (n) thereof (in FIG. 2(a), the minimum point of the valley part (N)), relative to the thickness direction of the resin layer 12.

It may be considered that the case as in FIG. 2(b) has two concave portions of a concave portion 131 having two mountain parts ($M_{11}$) and ($M_{12}$) and a valley part ($N_1$), and a concave portion 132 having two mountain parts ($M_{12}$) and ($M_{13}$) and a valley part ($N_2$). In this case, the length of the difference ($h_1$) between the maximum point of the mountain part ($M_{11}$) and the minimum point of the valley part ($N_1$) indicates the height difference of the concave portion 131, and the length of the difference ($h_2$) between the maximum point of the mountain part ($M_{13}$) and the minimum point of the valley part ($N_2$) indicates the height difference of the concave portion 132.

The "concave portions" as prescribed in the aforementioned requirement (I) refer to the concave portions having a height difference of 0.5 μm or more at maximum. The "concave portion" as prescribed in the foregoing requirement (I) may be one having a site with a height difference of 0.5 μm or more in any part of the concave portion, and the concave portion needs not to have the foregoing height difference in the entire region thereof.

Regarding the judgement on whether or not plural concave portions satisfying the requirement (I) exist, the region (P) surrounded by a square having an edge length of 5 mm that is arbitrarily selected on the surface (α) of the resin layer of the pressure sensitive adhesive sheet is observed with an electron microscope for the judgment. More specifically, the presence or absence is judged according to the method described in the section of Examples as described later.

From the viewpoint of improving the air escape property of the pressure sensitive adhesive sheet, from the viewpoint of keeping the appearance of the pressure sensitive adhesive sheet good, and from the viewpoint of the shape stability of the pressure sensitive adhesive sheet, the maximum value of the height difference of one concave portion is preferably 1.0 μm or more and not more than the thickness of the resin layer, more preferably 3.0 μm or more and not more than the thickness of the resin layer, and still more preferably 5.0 μm or more and not more than the thickness of the resin layer.

A ratio of the maximum value among the values of height difference of plural concave portions existing in the region (P) to the thickness of the resin layer [(maximum value of height difference)/(thickness of resin layer)] is preferably 1/100 to 100/100, more preferably 5/100 to 99/100, still more preferably 10/100 to 96/100, and yet still more preferably 15/100 to 90/100.

From the viewpoint of improving the air escape property of the pressure sensitive adhesive sheet and from the viewpoint of bettering the pressure sensitive adhesiveness of the pressure sensitive adhesive sheet, an average value of the width of the concave portions is preferably 1 to 500 μm, more preferably 3 to 400 μm, and still more preferably 5 to 300 μm.

In the present invention, the width of the concave portion means a distance between maximum points of the two mountain parts, and in the concave portion 13 shown in FIG. 2(a), the width indicates a distance L between the mountain part ($M_1$) and the mountain part ($M_2$). In the concave portion 131 shown in FIG. 2(b), the width indicates a distance $L_1$ between the mountain part ($M_{11}$) and the mountain part ($M_{12}$), and in the concave portion 132, the width indicates a distance $L_2$ between the mountain part ($M_{13}$) and the mountain part ($M_{12}$).

In a planar view of the pressure sensitive adhesive sheet of the present invention (when the sheet is viewed from directly above), when the concave portion has a long side and a short side, the short side is referred to as the width.

From the viewpoint of improving the air escape property of the pressure sensitive adhesive sheet and from the viewpoint of bettering the pressure sensitive adhesiveness of the pressure sensitive adhesive sheet, a ratio of the maximum value of height difference of one concave portion to the average value of the width [(maximum value of height difference)/(average value of width)] (in the concave portion 13 shown in FIG. 2(a), the ratio is "h/L") is preferably 1/500 to 100/1, more preferably 3/400 to 70/3, and still more preferably 1/60 to 10/1.

<Requirement (II)>

In the pressure sensitive adhesive sheet of the present invention, like the aforementioned requirement (II), one or more of the concave portions 13 or the concave portions 130 exist in a region (U) surrounded by a square 50 having an edge length of 600 μm that is arbitrarily selected on the surface (α) 12a, as shown in FIG. 3(a). In FIG. 3(a), eight concave portions exist in the region (U).

In this way, when the one or more concave portions exist in the region (U) on the surface (α), the air escape property of the pressure sensitive adhesive sheet can be improved.

In the present invention, though the number of concave portions as described above existing in the region (U) on the surface (α) is 1 or more, from the aforementioned viewpoint, it is preferably 2 or more, and more preferably 3 or more; whereas from the viewpoint of keeping the appearance and the pressure sensitive adhesion characteristics good, it is preferably 1,000 or less, more preferably 500 or less, still more preferably 300 or less, and yet still more preferably 100 or less.

From the viewpoint of improving the air escape property of the pressure sensitive adhesive sheet, it is preferred that one or more of the concave portions 13 or the concave portions 130 existing in the region (U) on the surface (α) 12a extend toward any side of the square 50 having an edge length of 600 μm that is a boundary line of the region (U), as shown in FIG. 3(a).

In FIG. 3, the number of the cross lines 13a between the extending concave portion 13 or the concave portions 130 and any side of the square 50 having an edge length of 600 μm that is a boundary line of the region (U) is 9 as a whole.

The number of the cross lines between the concave portion and any side of the square having an edge length of 600 μm that is a boundary line of the region (U) is preferably 1 or more, more preferably 2 or more, even more preferably 3 or more.

From the viewpoint of providing a pressure sensitive adhesive sheet having more improved air escape property and appearance, the one or more concave portions existing in the region (U) on the surface (α) of the resin layer which the pressure sensitive adhesive sheet that is one embodiment of the present invention has preferably have a shape that continuously extends into the other one or more regions (U') surrounded by a square having an edge length of 600 μm, which are adjacent to the region (U), more preferably have a shape that continuously extends into the other two or more regions (U'), and still more preferably have a shape that continuously extends into the other three or more regions (U').

For example, in FIG. 3(b), when the region (U) surrounded by the square 50 having an edge length of 600 μm that is arbitrarily selected on the surface (α) 12a is specifically noted, the "other region (U') surrounded by a square having an edge length of 600 μm, which is adjacent to the region (U)" indicates a region (U'1) surrounded by a square 501 having an edge length of 600 μm, a region (U'2) surrounded by a square 502 having an edge length of 600 μm, a region (U'3) surrounded by a square 503 having an edge length of 600 μm, and a region (U'4) surrounded by a square 504 having an edge length of 600 μm, respectively.

Furthermore, when the "concave portion 130" shown in FIG. 3(b) is specifically noted, though the "concave portion 130" is a region existing in the region (U) surrounded by the square 50 having an edge length of 600 μm and has a shape extending into the region (U'1) surrounded by the square 501 having an edge length of 600 μm adjacent to the region (U), into the region (U'2) surrounded by the square 502 having an edge length of 600 μm, and into the region (U'4) surrounded by the square 504 having an edge length of 600 μm, respectively.

When the concave portion having a shape extending not only into the region (U) but also into the other region (U') adjacent to the region (U) on the surface (α), like the "concave portion 130" shown in FIG. 3(b), exists, a pressure sensitive adhesive sheet having more improved air escape property is provided.

In addition, it is preferred that the concave portions existing in the region (U) on the surface (α) of the resin layer have a shape extending not only into the one or more regions (U') adjacent to the region (U) but also further continuously into any other region (U") than the region (U), which is adjacent to the other region (U').

For example, the "concave portion 130" shown in FIG. 3(b) has a shape extending not only into the region (U'4) adjacent to the region (U) but also further continuously into a region (U'5) adjacent to the region (U'4).

<Other Suitable Requirements>

In the pressure sensitive adhesive sheet of the present invention, it is preferred that the positions at which the plural concave portions exist on the surface (α) do not have any periodicity.

FIGS. 3 (a) and 3(b) are each a schematic plan view of the surface (α), showing one example of the surface (α) of the resin layer which the pressure sensitive adhesive sheet that is one embodiment of the present invention has. As shown in FIG. 3(a), the plural concave portions 13 and 130 exist on the surface (α) 12a of the resin layer 12 of the pressure sensitive adhesive sheet of the present invention.

Here, in the pressure sensitive adhesive sheet of the present invention, as described above, it is preferred that the plural concave portions exist on the surface (α) 12a of the resin layer 12, and the positions at which the plural concave portions exist do not have any periodicity, as shown in FIG. 3(a).

In the present invention, the wording "the positions at which the plural concave portions exist do not have any periodicity" means that the positions at which the plural concave portions exist do not have the same repeating pattern and are in a random state. Namely, the state differs from a state of "arrangement" based on fixed regularity, like that for the grooves described in PTL 1, that is, like that for grooves formed by transfer of an embossed pattern of pressing a release material having an embossed pattern against the surface of a resin layer.

For the judgement on whether or not "the positions at which the plural concave portions exist do not have any periodicity", in principle, the positions of the plural concave portions existing on the surface (α) of the resin layer of the targeted pressure sensitive adhesive sheet are observed for the judgement through visual inspection or with a digital microscope (magnification: 30 to 100 times).

However, the judgement may also be performed by selecting 10 regions of the region (V) having an area of 8.93 mm² surrounded by a rectangle of 3.45 mm in long side and 2.59 mm in short side that is arbitrarily selected on the surface (α) and observing the "positions of the plural concave portions" existing in each of the regions (V) through visual inspection or with a digital microscope (magnification: 30 to 100 times). Namely, in all of the selected 10 regions, in the case where the "positions of the plural concave portions" existing in each of the regions do not have any fixed regularity, the targeted pressure sensitive adhesive sheet can be considered to be one in which "the positions at which the plural concave portions exist do not have any periodicity".

For the aforementioned observation of the positions at which the plural concave portions are formed, a method of direct observation thereof with a digital microscope at the magnification as mentioned above may be employed, or a method of acquiring an image thereof with a digital microscope at the aforementioned magnification, followed by observing the positions at which the plural concave portions exist as shown in the image through visual inspection may also be employed.

From the viewpoint of providing a pressure sensitive adhesive sheet having more improved various characteristics, such as air escape property, appearance, pressure sensitive adhesion characteristics, punching property, etc., with a well balance, it is preferred that the shape of the flat face on the surface (α) of the resin layer of the pressure sensitive adhesive sheet that is one embodiment of the present invention is irregular.

In the present invention, the "flat face on the surface (α)" means a surface from which the range occupied by the plural concave portions on the surface (α) of the resin layer is excluded, and means a face to be attached to an adherend when attached to the adherend. Accordingly, the flat face existing on the surface (α) is a site influencing the pressure sensitive adhesive strength of the pressure sensitive adhesive sheet.

In the schematic plan view as shown in FIG. 3(a), the "flat face" refers to a shaded part 15 of the surface (α) 12a of the resin layer from which the plural concave portions 13 are excluded.

The wording "the shape of the attached face is irregular" means that the shape of the flat face does not have a regular shape, such as a figure capable of drawing a center of a circle, an oval, or the like, a polygon, etc., but refers to a shape in which no regularity is present in the form, and no similarity is found in individual shapes, like the shape, such as the shaded part 15 of the surface (α) 12a of the resin layer as shown in FIG. 3(a) and the flat face 15 shown on the digital microscopic photograph of FIG. 6(a), etc. Specifically, the shapes of the flat face 15 and the concave portions 13 shown in FIG. 3 are corresponding thereto.

The "polygon" which is excluded from the irregular shape as referred to herein refers to a figure capable of drawing diagonal lines in the inside thereof (without being protruded outside) and being surrounded by straight lines in which the sum of interior angles is 180×n (degrees) (n is a natural number). The polygon also includes one in which an edge part thereof has a round-shaped curvature.

In addition, the wording "the shape of the attached face is irregular" means that the shape does not have a regular shape, such as a figure capable of drawing a center of a circle, an oval, or the like, a polygon, etc., and does not have a predetermined repeating pattern. Namely, a shape of the flat face to be formed by transfer of an embossed pattern by pressing a release material having an embossed pattern against the surface of the resin layer, or the like, is excluded.

For the judgement on whether or not "the shape of the flat face on the surface (α) is irregular", in principle, the shape of the flat face on the surface (α) of the resin layer of the targeted pressure sensitive adhesive sheet is observed for the judgement through visual inspection or with a digital microscope (magnification: 30 to 100 times) from the side of the surface (α).

However, on the occasion of selecting 10 regions of the region (V) having an area of 8.93 mm$^2$ surrounded by a rectangle of 3.45 mm in long side and 2.59 mm in short side that is arbitrarily selected on the surface (α) and observing the "shape of the flat face" existing in each of the regions (V) through visual inspection or in a planar view (a stereoscopic view as the need arises) from the side of surface (α) with a digital microscope (magnification: 30 to 100 times), when in all of the selected ten regions, the "shape of the flat face" existing in each region is judged to be irregular, it can be considered that the targeted pressure sensitive adhesive sheet satisfies the requirement that the shape of the flat face on the surface (α) is irregular. In the case where the foregoing region (V) is larger than a photographable region with the digital microscope, an image resulting from connection of the plural images obtained by photographing the photographable regions adjoining each other may also be used as an image to be observed in the region (V) for the aforementioned judgement.

For the aforementioned observation of the shape of the flat face, a method of direct observation thereof with a digital microscope at the aforementioned magnification may be employed, or a method of acquiring an image thereof with a digital microscope at the aforementioned magnification, followed by observing the shape of the flat face shown in the image through visual inspection may also be employed. In addition, it is preferred that the matter that the shape of the foregoing flat face is irregular can be viewed through visual inspection from the side of the surface (α) of the resin layer.

On attaching the surface (α) of the resin layer of the pressure sensitive adhesive sheet of the present invention to an adherend, a ratio of the attached face area to the adherend (hereinafter also referred to as "attached face area ratio") is preferably 10 to 95%.

Here, when the ratio of the attached face area to the adherend is 10% or more, the adhesive face between the surface (α) of the resin layer and the adherend can be thoroughly secured, and the pressure sensitive adhesion characteristics are improved, whereby the possibility of generation of peeling can be reduced.

Meanwhile, when the ratio of the attached face area to the adherend is 95% or less, the air escape property of the pressure sensitive adhesive sheet becomes sufficient, whereby the air accumulation which is possibly generated at the time of attaching to the adherend is readily removed.

From the aforementioned viewpoints, the aforementioned ratio of the attached face area to the adherend is more preferably 20 to 93%, still more preferably 30 to 90%, yet still more preferably 35 to 85%, even yet still more preferably 40 to 80%, and even still more preferably 45 to 75%.

In the present invention, specifically, the value of "on attaching the surface (α) of the resin layer of the pressure sensitive adhesive sheet of the present invention to an adherend, a ratio of the attached face area to the adherend" means a value measured according to the method described in the section of Examples as described later.

In the pressure sensitive adhesive sheet that is one embodiment of the present invention, in a planar view of the surface (α) of the resin layer on attaching the surface (α) to an adherend, in a region (Vs) having an area of 8.93 mm$^2$ surrounded by a rectangle of 3.45 mm in long side and 2.59 mm in short side that is arbitrarily selected on the surface (α), a proportion of the total area of the concave portions having a shape different from other concave portions existing in the region (Vs) is preferably 95% or more, more preferably 98% or more, and still more preferably 100% relative to the whole area of all of the concave portions existing in the region (Vs).

In a planar view of the surface (α) of the resin layer on attaching to an adherend, a method for confirming the proportion of the total area of the concave portions having a shape different from other concave portions existing in the region (Vs) relative to the whole area of all of the concave portions existing in the region (V) is as follows. That is, with respect to the targeted pressure sensitive adhesive sheet, when the shapes of the plural concave portions existing in the region (Vs) having an area of 8.93 mm$^2$ surrounded by a rectangle of 3.45 mm in long side and 2.59 mm in short side that is arbitrarily selected on the surface (α) of the resin layer on attaching to an adherend are observed with a digital microscope (magnification: 30 to 100 times) to measure areas thereof, and the total area of the concave portions having a shape different from other concave portions (namely, corresponding to the aforementioned concave portions having a different shape from each other) is preferably 95% or more (more preferably 98% or more, and still more preferably 100%) relative to the whole area of areas of the plural concave portions observed in the region (Vs), the pressure sensitive adhesive sheet is judged to be a pressure sensitive adhesive sheet satisfying the matter that the proportion of the total area of the concave portions having a shape different from other concave portions existing in the region (Vs) is 95% or more relative to the whole area of all of the concave portions existing in the region (Vs). For the judgement on whether or not the concave portion is different from other concave portions existing in the region (Vs), a method in which an image is acquired with a digital microscope at the aforementioned magnification, and an area or a perimeter of the concave portion is measured, thereby judging whether or not the resulting numerical value is identical may be employed, or a method in which the judgment is performed by observing the shapes of the plural concave portions shown in the image through visual inspection may also be employed.

Here, the wording "the proportion of the total area of the concave portions having a shape different from other concave portions is 100%" means that "all of the plural concave portions observed in the region (Vs) have a different shape from each other".

As the adherent to be used in the case of performing the aforementioned observation, a "translucent adherend having a smooth face" is used. The "smooth face" of the "translucent adherend having a smooth face" means a face having a center-line average roughness ($Ra_{75}$) as prescribed in JIS B0601:2001 of 0.1 μm or less.

The wording "translucent" means such a characteristic that the total light transmittance to be measured in conformity with JIS K7105 is 70% or more.

Though the material of the translucent adherend is not particularly limited, from the viewpoint of readily providing a translucent adherend having a smooth face as prescribed above and from performing the observation through visual inspection or with a digital microscope, a glass is preferred.

More specifically, as for the aforementioned evaluation results, the judgement is performed according to the method described in the section of Examples as described later.

The adherend as an attaching object of the pressure sensitive adhesive sheet of the present invention is not particularly limited with respect to the presence or absence of the smooth face or the presence or absence of translucency, and for example, it may be a translucent adherend composed of a curved surface.

From the viewpoint of providing a pressure sensitive adhesive sheet with improved air escape property, it is preferred that on attaching the surface (α) to the smooth face of the translucent adherend, the shape of the contact part of the surface (α) with the smooth face of the translucent adherend can be viewed from the side of the translucent adherend through visual inspection.

In the pressure sensitive adhesive sheet that is one embodiment of the present invention, in a planar view of the surface (α) of the resin layer, the whole area of flat faces existing in a region (V) having an area of 8.93 mm² surrounded by a rectangle of 3.45 mm in long side and 2.59 mm in short side that is arbitrarily selected on the surface (α) is preferably 1.0 mm² or more, more preferably 2.0 mm² or more, still more preferably 3.0 mm² or more, yet still more preferably 4.0 mm² or more, and even yet still more preferably 5.0 mm² or more, and preferably 8.5 mm² or less, more preferably 7.3 mm² or less, still more preferably 6.2 mm² or less, and yet still more preferably 5.8 mm² or less.

In the pressure sensitive adhesive sheet that is one embodiment of the present invention, in a planar view of the surface (α) of the resin layer, preferably, at least one flat face having such an area that a region surrounded by a circle having a diameter of 100 μm is selectable exists, more preferably, at least one flat face having such an area that a region surrounded by a circle having a diameter of 150 μm is selectable exists, and still more preferably, at least one flat face having such an area that a region surrounded by a circle having a diameter of 200 μm is selectable exists, in the region (V) having an area of 8.93 mm² surrounded by a rectangle of 3.45 mm in long side and 2.59 mm in short side that is arbitrarily selected on the surface (α).

In the pressure sensitive adhesive sheet that is one embodiment of the present invention, in a planar view of the surface (α) of the resin layer, preferably, at least one flat face having an area of 0.1 mm² or more exists, more preferably, at least one flat face having an area of 0.2 mm² or more exists, still more preferably, at least one flat face having an area of 0.3 mm² or more exists, yet still more preferably, at least one flat face having an area of 0.5 mm² or more exists, and even yet still more preferably, at least one flat face having an area of 1.0 mm² or more exists, in the region (V) having an area of 8.93 mm² surrounded by a rectangle of 3.45 mm in long side and 2.59 mm in short side that is arbitrarily selected on the surface (α). In addition, a maximum value of the area of the flat face is preferably 8.5 mm² or less, more preferably 7.3 mm² or less, still more preferably 6.2 mm² or less, and yet still more preferably 5.8 mm² or less.

In a planar view of the surface (α) of the resin layer, an area of each flat face existing in the region (V), the judgement on whether or not at least one flat face having such an area that a region surrounded by a circle having a diameter of 100 μm (a circle of 150 μm or a circle of 200 μm) is selectable exists and a method for confirming the areas of all flat faces (whole area) are as follows. That is, with respect to the targeted pressure sensitive adhesive sheet, the shapes of the plural flat faces existing in the region (V) having an area of 8.93 mm² surrounded by a rectangle of 3.45 mm in long side and 2.59 mm in short side that is arbitrarily selected on the surface (α) of the resin layer prior to attaching to the adherend are observed with a digital microscope (magnification: 30 to 100 times) to measure areas thereof, and the total area of areas of the plural flat faces observed in the region (V) is defined as the whole area of flat faces. For confirming the area of each flat face in the region (V) and the areas of all flat faces (whole area), the confirmation can be performed by acquiring an image with a digital microscope at the aforementioned magnification and measuring the area of the flat faces shown in the image. In addition, the judgement on whether or not at least one flat face having such an area that a region surrounded by a circle having a diameter of 100 μm (a circle of 150 μm or a circle of 200 μm) is selectable exists can be confirmed from the foregoing image or an image obtained by binarization using image analysis software. More specifically, the judgement is performed according to the method described in the section of Examples as described later.

Each configuration of the pressure sensitive adhesive sheet of the present invention is hereunder described.

[Substrate]

The substrate to be used in the present invention has a bending stress coefficient k in the MD direction of 20.0 N·mm or less and a 10% elongation strength in the MD direction of 260 N/15 mm or less.

Here, the bending stress coefficient k is a coefficient calculated from a Young's modulus and a thickness of the substrate and is a value obtained according to the following expression (1).

$$k = E \times h^3 \qquad (1)$$

k: bending stress coefficient [N·mm], E: Young's modulus [N/mm²], h: thickness [mm]

More specifically, the bending stress coefficient k is obtained according to the method described in the section of Examples as described later.

When the bending stress coefficient k in the MD direction of the substrate to be used in the present invention is more than 20.0 N·mm, the folding attaching property of the pressure sensitive adhesive sheet of the present invention is worsened. In consequence, from the viewpoint of obtaining excellent folding attaching property of the pressure sensitive adhesive sheet, the value of the bending stress coefficient k in the MD direction is preferably 10.0 N·mm or less, more preferably 3.5 N·mm or less, still more preferably 1.50

N·mm or less, yet still more preferably 1.00 N·mm or less, and even yet still more preferably 0.90 N·mm or less.

Though a lower limit of the bending stress coefficient k in the MD direction is not particularly limited within a range where the effects of the present invention are not impaired, it is preferably 0.005 N·mm or more, and more preferably 0.01 N·mm or more.

When the 10% elongation strength in the MD direction of the substrate to be used in the present invention is more than 260 N/15 mm, the folding attaching property of the pressure sensitive adhesive sheet of the present invention is worsened. In consequence, from the viewpoint of obtaining excellent folding attaching property of the pressure sensitive adhesive sheet, the 10% elongation strength in the MD direction is preferably 210 N/15 mm or less, more preferably 150 N/15 mm or less, still more preferably 100 N/15 mm or less, and yet still more preferably 50 N/15 mm or less.

Though a lower limit of the 10% elongation strength in the MD direction is not particularly limited within a range where the effects of the present invention are not impaired, it is preferably 0.5 N/15 mm or more, and more preferably 1.0 N/15 mm or more.

In the substrate to be used in the present invention, from the viewpoint of obtaining more favorable folding attaching property of the pressure sensitive adhesive sheet, the Young's modulus E in the MD direction is preferably 7,000 MPa or less, more preferably 4,500 MPa or less, still more preferably 3,000 MPa or less, yet still more preferably 2,000 MPa or less, and even yet still more preferably 1,500 MPa or less.

Though a lower limit of the Young's modulus E in the MD direction is not particularly limited within a range where the effects of the present invention are not impaired, it is preferably 50 MPa or more, and more preferably 100 MPa or more.

The substrate to be used in the present invention is not particularly limited so long as the bending stress coefficient k in the MD direction and the 10% elongation strength in the MD direction satisfy the aforementioned numerical value ranges, and examples thereof include a paper substrate, a resin film or sheet, a substrate resulting from lamination of a paper substrate with a resin, and the like, and the substrate can be appropriately selected depending upon an application of the pressure sensitive adhesive sheet of one embodiment of the present invention.

Examples of paper constituting the paper substrate include thin paper, medium quality paper, wood-free paper, impregnated paper, coated paper, art paper, parchment paper, glassine paper, and the like.

Examples of the resin constituting the resin film or sheet include a polyolefin resin, such as polyethylene, polypropylene, etc.; a vinyl resin, such as polyvinyl chloride, polyvinylidene chloride, polyvinyl alcohol, an ethylene-vinyl acetate copolymer, an ethylene-vinyl alcohol copolymer, etc.; a polyester resin, such as polyethylene terephthalate, polybutylene terephthalate, polyethylene naphthalate, etc.; polystyrene; an acrylonitrile-butadiene-styrene copolymer; cellulose triacetate; polycarbonate; a urethane resin, such as polyurethane, acrylic-modified polyurethane, etc.; polymethylpentene; polysulfone; polyetheretherketone; polyether sulfone; polyphenylene sulfide; a polyimide resin, such as polyether imide, polyimide, etc.; a polyamide resin; an acrylic resin; a fluorine resin; and the like.

Examples of the substrate resulting from lamination of a paper substrate with a resin include laminated paper resulting from lamination of the aforementioned paper substrate with a thermoplastic resin, such as polyethylene, etc.; and the like.

Among these substrates, from the viewpoint of making it easy to control the Young's modulus E in the MD direction, the bending stress coefficient k in the MD direction, and the 10% elongation strength in the MD direction to aforementioned numerical value ranges, a resin film or sheet is preferred; a film or sheet made of a polyolefin resin, a film or sheet made of a polyester resin, and a film or sheet made of polyvinyl chloride are more preferred; and a film or sheet made of a polyolefin resin and a film or sheet made of polyvinyl chloride are still more preferred.

In the case where the pressure sensitive adhesive sheet of the present invention is used for an application requiring the heat resistance, a film or sheet constituted of a resin selected from polyethylene naphthalate and a polyimide resin is preferred, and in the case where the pressure sensitive adhesive sheet is used for an application requiring the weather resistance, a film or sheet constituted of a resin selected from polyvinyl chloride, polyvinylidene chloride, an acrylic resin, and a fluorine resin is preferred.

Though the thickness of the substrate may be suitably set according to an application of the pressure sensitive adhesive sheet of the present invention, from the viewpoint of making it easy to control the bending stress coefficient k in the MD direction and the 10% elongation strength in the MD direction to aforementioned numerical value ranges, it is preferably 5 to 1,000 µm, more preferably 10 to 500 µm, still more preferably 12 to 250 µm, and yet still more preferably 15 to 150 µm.

The substrate may further contain various additives, such as an ultraviolet ray absorbent, a light stabilizer, an antioxidant, an antistatic agent, a slipping agent, an antiblocking agent, a colorant, etc.

The substrate to be used in the present invention may also be a substrate having a metal layer on the surface of the aforementioned resin film or sheet.

Examples of the metal which forms the metal layer include a metal having metallic gloss, such as aluminum, tin, chromium, titanium, etc.; and the like.

Examples of the method of forming the metal layer include a method of vapor-depositing the aforementioned metal by the PVD method, such as vacuum vapor deposition, sputtering, ion plating, etc.; a method of attaching a metal foil formed of the aforementioned metal with an ordinary pressure sensitive adhesive; and the like. Among those, a method of vapor-depositing the aforementioned metal by the PVD method is preferred.

Furthermore, in the case where a resin film or sheet is used as the substrate, from the viewpoint of improving the adhesion to the resin layer to be laminated on the resin film or sheet, the surface of the resin film or sheet may be subjected to a surface treatment by an oxidizing method, a roughening method, or the like, or may be subjected to a primer treatment.

Examples of the oxidizing method include a corona discharge treatment, a plasma discharge treatment, a chromic acid treatment (wet process), a hot air treatment, an ozone treatment, an ultraviolet ray irradiation treatment, and the like, and examples of the roughening treatment include a sand blasting treatment, a solvent treatment, and the like.

[Resin Layer]

The resin layer which the pressure sensitive adhesive sheet of the present invention has contains a resin part (X) containing a resin as a main component and a particle part (Y) consisting of fine particles, and it is not particularly limited so long as it satisfies the aforementioned requirements (I) and (II) regarding the surface ($\alpha$).

In the pressure sensitive adhesive sheet of the present invention, though at least the surface ($\alpha$) of the resin layer on the side opposite to the side thereof on which the substrate is provided has pressure sensitive adhesiveness, the surface ($\beta$) of the resin layer on the side thereof on which the substrate is provided may also have pressure sensitive adhesiveness.

As the resin which the resin layer contains, for example, resins to be contained in the resin part (X) as described later are exemplified.

It is preferred that the resin layer which the pressure sensitive adhesive sheet of one embodiment of the present invention has additionally has a void part (Z) in addition to the resin part (X) and the particle part (Y). When the resin layer has the void part (Z), the blister resistance of the pressure sensitive adhesive sheet can be improved.

The void part (Z) includes voids existing between the aforementioned fine particles as well as, when the aforementioned fine particles are secondary particles, voids existing inside the secondary particles.

In the case where the resin layer has a multilayer structure, even though the void part (Z) exists in the process of forming the resin layer or just after formation of the resin layer, the resin part (X) may flow into the void part (Z), and therefore, the voids may disappear to give a resin layer not having the void part (Z).

However, even in the case where the void part (Z) having existed in the resin layer for a period of time has disappeared, the resin layer which the pressure sensitive adhesive sheet that is one embodiment of the present invention has the concave portions on the surface ($\alpha$), and therefore, it may be excellent in the air escape property and the blister resistance.

From the viewpoint of improving the air escape property and the blister resistance of the pressure sensitive adhesive sheet, the shear storage elastic modulus at 100° C. of the resin layer which the pressure sensitive adhesive sheet that is one embodiment of the present invention has is preferably $9.0 \times 10^3$ Pa or more, more preferably $1.0 \times 10^4$ Pa or more, and still more preferably $2.0 \times 10^4$ Pa or more.

In the present invention, the shear storage elastic modulus at 100° C. of the resin layer means a value measured with a viscoelastometer (for example, an apparatus name: "DYNAMIC ANALYZER RDA II", manufactured by Rheometrics Inc.) at a frequency of 1 Hz.

The thickness of the resin layer is preferably 1 to 300 μm, more preferably 5 to 150 μm, and still more preferably 10 to 75 μm.

The pressure sensitive adhesive strength when the surface ($\alpha$) of the pressure sensitive adhesive sheet that is one embodiment of the pressure sensitive adhesive sheet of the present invention is attached to the adherend is preferably 0.5 N/25 mm or more, more preferably 2.0 N/25 mm or more, still more preferably 3.0 N/25 mm or more, yet still more preferably 4.0 N/25 mm or more, and even yet still more preferably 7.0 N/25 mm or more.

Specifically, the value of the pressure sensitive adhesive strength means a value measured according to the method described in the section of Examples as described later.

<Multilayer Structure of Resin Layer>

The resin layer may be a multilayer structure configured of two or more layers.

Examples of the resin layer that is such a multilayer structure and suitable configurations thereof are those described above in the section of [Configuration of Pressure Sensitive Adhesive Sheet]. The resin part (X) and the particle part (Y) are hereunder further described.

<Resin Part (X)>

The resin part (X) constituting the aforementioned resin layer contains a resin as a main component.

In the present invention, the resin part (X) is a part containing any other component than fine particles contained in the resin layer, and in this point, this is differentiated from the particle part (Y).

The resin part (X) contains a resin as a main component and may contain a crosslinking agent and ordinary additives in addition to the resin.

The content of the resin in the resin part (X) is typically 40% by mass or more, preferably 50% by mass or more, more preferably 65% by mass or more, still more preferably 75% by mass or more, yet still more preferably 85% by mass or more, and even yet still more preferably 90% by mass or more, and preferably 100% by mass or less, and more preferably 99.9% by mass or less, relative to the total amount (100% by mass) of the resin part (X).

In the present invention, a value of the content of the resin in the total amount (100% by mass (but excluding diluent solvent)) of the resin composition to be the forming material for the resin part (X) can also be considered to be the aforementioned "content of the resin in the resin part (X)".

It is preferred that the aforementioned resin which is contained in the resin part (X) contains a pressure sensitive adhesive resin from the viewpoint of revealing pressure sensitive adhesiveness on the surface ($\alpha$) of the resin layer to be formed.

In particular, in the case where the resin layer has a multilayer structure formed by laminating a layer (X$\beta$), a layer (Y1), and a layer (X$\alpha$) in this order from the substrate side, like in the pressure sensitive adhesive sheet 1$a$, etc. of FIG. 1($a$), from the aforementioned viewpoints, it is preferred that at least the layer (X$\alpha$) contains a pressure sensitive adhesive resin.

Examples of the pressure sensitive adhesive resin include an acrylic resin, a urethane resin, a rubber resin, a silicone resin, and the like.

Among these pressure sensitive adhesive resins, an acrylic resin is preferably contained from the viewpoints of bettering the pressure sensitive adhesion characteristics and the weather resistance and facilitating the formation of plural concave portions satisfying the aforementioned requirements (I) and (II) on the surface ($\alpha$) of the resin layer to be formed.

The content of the acrylic resin is preferably 25 to 100% by mass, more preferably 50 to 100% by mass, still more preferably 70 to 100% by mass, yet still more preferably 80 to 100% by mass, and even yet still more preferably 100% by mass relative to the total amount (100% by mass) of the resin to be contained in the resin part (X).

From the viewpoint of facilitating the formation of plural concave portions satisfying the aforementioned requirements (I) and (II) on the surface ($\alpha$) of the resin layer to be formed, the resin part (X) preferably contains a resin having a functional group, and more preferably contains an acrylic resin having a functional group.

In particular, in the case where the resin layer has a multilayer structure formed by laminating a layer (X$\beta$), a layer (Y1), and a layer (X$\alpha$) in this order from the substrate side, like in the pressure sensitive adhesive sheet 1$a$, etc. of FIG. 1($a$), from the aforementioned viewpoints, it is preferred that at least the layer (Y1) contains a resin having a functional group.

The functional group is a group to be a crosslinking start point with a crosslinking agent, and examples thereof include a hydroxy group, a carboxy group, an epoxy group, an amino group, a cyano group, a keto group, an alkoxysilyl group, and the like, with a carboxy group being preferred.

It is preferred that the resin part (X) further contains a crosslinking agent together with the aforementioned resin having a functional group. In particular, in the case where the resin layer has the aforementioned multilayer structure, it is preferred that at least the layer (Y1) contains a crosslinking agent together with the aforementioned resin having a functional group.

Examples of the crosslinking agent include an isocyanate crosslinking agent, an epoxy crosslinking agent, an aziridine crosslinking agent, a metal chelate crosslinking agent, and the like.

Examples of the isocyanate crosslinking agent include aromatic polyisocyanates, such as tolylene diisocyanate, diphenylmethane diisocyanate, xylylene diisocyanate, etc.; aliphatic polyisocyanates, such as hexamethylene diisocyanate, etc.; alicyclic polyisocyanates, such as isophorone diisocyanate, hydrogenated diphenylmethane diisocyanate, etc.; biuret forms and isocyanurate forms of these compounds, and adduct forms that are a reaction product with a low-molecular active hydrogen-containing compound (e.g., ethylene glycol, propylene glycol, neopentyl glycol, trimethylolpropane, castor oil, etc.); and the like.

Examples of the epoxy crosslinking agent include ethylene glycol glycidyl ether, 1,3-bis(N,N-diglycidylaminomethyl)cyclohexane, N,N,N',N'-tetraglycidyl-m-xylylenediamine, 1,6-hexanediol diglycidyl ether, trimethylolpropane diglycidyl ether, diglycidylaniline, diglycidylamine, and the like.

Examples of the aziridine crosslinking agent include diphenylmethane-4,4'-bis(1-aziridinecarboxamide), trimethylolpropane tri-β-aziridinyl propionate, tetramethylolmethane tri-β-aziridinyl propionate, toluene-2,4-bis(1-aziridinecarboxamide), triethylenemelamine, bisisophthaloyl-1-(2-methylaziridine), tris-1-(2-methylaziridine)phosphine, trimethylolpropane tri-β-(2-methylaziridine) propionate, and the like.

The metal chelate crosslinking agent includes chelate compounds in which the metal atom is aluminum, zirconium, titanium, zinc, iron, tin, or the like. From the viewpoint of facilitating the formation of plural concave portions satisfying the aforementioned requirements (I) and (II), an aluminum chelate crosslinking agent is preferred.

Examples of the aluminum chelate crosslinking agent include diisopropoxyaluminum monooleyl acetoacetate, monoisopropoxyaluminum bisoleyl acetoacetate, monoisopropoxyaluminum monooleate monoethyl acetoacetate, diisopropoxyaluminum monolauryl acetoacetate, diisopropoxyaluminum monostearyl acetoacetate, diisopropoxyaluminum monoisostearyl acetoacetate, and the like.

These crosslinking agents may be used either alone or in combination of two or more thereof.

Among these, from the viewpoint of facilitating the formation of plural concave portions satisfying the aforementioned requirements (I) and (II) on the surface (α) of the resin layer to be formed, the resin part (X) preferably contains one or more selected from a metal chelate crosslinking agent and an epoxy crosslinking agent, more preferably contains a metal chelate crosslinking agent, and still more preferably contains an aluminum chelate crosslinking agent.

The content of the crosslinking agent is preferably 0.01 to 15 parts by mass, more preferably 0.1 to 10 parts by mass, and still more preferably 0.3 to 7.0 parts by mass relative to 100 parts by mass of the resin having a functional group.

As one embodiment of the resin layer of the present invention, from the viewpoint of facilitating the formation of concave portions on the surface (α) of the resin layer, the resin part (X) preferably contains both a metal chelate crosslinking agent and an epoxy crosslinking agent and preferably contains both an aluminum chelate crosslinking agent and an epoxy crosslinking agent.

In the case where the resin part (X) contains both a metal chelate crosslinking agent and an epoxy crosslinking agent, from the aforementioned viewpoints, the content ratio of the metal chelate crosslinking agent to the epoxy crosslinking agent [(metal chelate crosslinking agent)/(epoxy crosslinking agent)] is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

The resin part (X) may contain an ordinary additive.

Examples of the ordinary additive include a tackifier, an antioxidant, a softener (plasticizer), a rust inhibitor, a pigment, a dye, a retardant, a reaction accelerator, an ultraviolet ray absorbent, and the like.

These ordinary additives may be each used either alone or in combination of two or more thereof.

In the case where these ordinary additives are contained, the content of each of the ordinary additives is preferably 0.0001 to 60 parts by mass, and more preferably 0.001 to 50 parts by mass relative to 100 parts by mass of the resin.

The aforementioned resin which is contained in the resin part (X) may be used either alone or in combination of two or more thereof.

The forming material for the resin part (X) of the resin layer which the pressure sensitive adhesive sheet of the present invention has is preferably a pressure sensitive adhesive containing a pressure sensitive adhesive resin having a functional group, more preferably an acrylic pressure sensitive adhesive containing an acrylic resin (A) having a functional group (hereinafter also referred to simply as "acrylic resin (A)"), and still more preferably an acrylic pressure sensitive adhesive containing an acrylic resin (A) having a functional group and a crosslinking agent (B).

The acrylic pressure sensitive adhesive may be any of a solvent type or an emulsion type.

The aforementioned acrylic pressure sensitive adhesive which is suitable as the forming material for the resin part (X) is hereunder described.

Examples of the acrylic resin (A) contained in the acrylic pressure sensitive adhesive include a polymer having a structural unit derived from an alkyl (meth)acrylate having a linear or branched alkyl group, a polymer having a structural unit derived from a (meth)acrylate having a cyclic structure, and the like.

The mass average molecular weight (Mw) of the acrylic resin (A) is preferably 50,000 to 1,500,000, more preferably 150,000 to 1,300,000, still more preferably 250,000 to 1,100,000, and yet still more preferably 350,000 to 900,000.

The acrylic resin (A) preferably contains an acrylic copolymer (A1) having a structural unit (a1) derived from an alkyl (meth)acrylate (a1') having an alkyl group with 1 to 18 carbon atoms (hereinafter also referred to as "monomer (a1')") and a structural unit (a2) derived from a functional group-containing monomer (a2') (hereinafter also referred to as "monomer (a2')"), and more preferably contains an acrylic copolymer (A1).

The content of the acrylic copolymer (A1) is preferably 50 to 100% by mass, more preferably 70 to 100% by mass, still more preferably 80 to 100% by mass, and yet still more preferably 90 to 100% by mass relative to the total amount (100% by mass) of the acrylic resin (A) in the acrylic pressure sensitive adhesive.

The copolymerization morphology of the acrylic copolymer (A1) is not particularly limited, and the copolymer may be any of a block copolymer, a random copolymer, or a graft copolymer.

From the viewpoint of improving the pressure sensitive adhesion characteristics, the carbon number of the alkyl group which the monomer (a1') has is more preferably 4 to 12, still more preferably 4 to 8, and yet still more preferably 4 to 6.

Examples of the monomer (a1') include methyl (meth)acrylate, ethyl (meth)acrylate, propyl (meth)acrylate, butyl (meth)acrylate, 2-ethylhexyl (meth)acrylate, lauryl (meth)acrylate, tridecyl (meth)acrylate, stearyl (meth)acrylate, and the like.

Among these, butyl (meth)acrylate and 2-ethylhexyl (meth)acrylate are preferred, and butyl (meth)acrylate is more preferred.

The content of the structural unit (a1) is preferably 50 to 99.5% by mass, more preferably 60 to 99% by mass, still more preferably 70 to 95% by mass, and yet still more preferably 80 to 93% by mass relative to all the structural units (100% by mass) of the acrylic copolymer (A1).

Examples of the monomer (a2') include a hydroxy group-containing monomer, a carboxy group-containing monomer, an epoxy group-containing monomer, an amino group-containing monomer, a cyano group-containing monomer, a keto group-containing monomer, an alkoxysilyl group-containing monomer, and the like.

Among these, a carboxy group-containing monomer is more preferred.

Examples of the carboxy group-containing monomer include (meth)acrylic acid, maleic acid, fumaric acid, itaconic acid, and the like, with (meth)acrylic acid being preferred.

The content of the structural unit (a2) is preferably 0.5 to 50% by mass, more preferably 1 to 40% by mass, still more preferably 5 to 30% by mass, and yet still more preferably 7 to 20% by mass relative to all the structural units (100% by mass) of the acrylic copolymer (A1).

The acrylic copolymer (A1) may have a structural unit (a3) derived from any other monomer (a3') than the aforementioned monomers (a1') and (a2').

Examples of the other monomer (a3') include (meth)acrylates having a cyclic structure, such as cyclohexyl (meth)acrylate, benzyl (meth)acrylate, isobornyl (meth)acrylate, dicyclopentanyl (meth)acrylate, dicyclopentenyl (meth)acrylate, dicyclopentenyloxyethyl (meth)acrylate, imido(meth)acrylate, etc.; vinyl acetate, acrylonitrile, styrene, and the like.

The content of the structural unit (a3) is preferably 0 to 30% by mass, more preferably 0 to 20% by mass, still more preferably 0 to 10% by mass, and yet still more preferably 0 to 5% by mass relative to all the structural units (100% by mass) of the acrylic copolymer (A1).

The aforementioned monomers (a1') to (a3') may be each used either alone or in combination of two or more thereof.

A method for synthesis of the acrylic copolymer (A1) component is not particularly limited. For example, the copolymer is produced according to a method including dissolving raw material monomers in a solvent and polymerizing them in a mode of solution polymerization in the presence of a polymerization initiator, a chain transfer agent, and the like, or a method of emulsion polymerization in an aqueous system using raw material monomers in the presence of an emulsifier, a polymerization initiator, a chain transfer agent, a dispersant, and the like.

Though the crosslinking agent (B) to be contained in the aforementioned acrylic pressure sensitive adhesive includes those as described above, but from the viewpoint of bettering the pressure sensitive adhesion characteristics and from the viewpoint of facilitating the formation of plural concave portions satisfying the aforementioned requirements (I) and (II) on the surface ($\alpha$) of the resin layer to be formed, one or more selected from a metal chelate crosslinking agent and an epoxy crosslinking agent are preferably contained, a metal chelate crosslinking agent is more preferably contained, and an aluminum chelate crosslinking agent is still more preferably contained.

From the viewpoint of bettering the shape retentivity of the plural concave portions on the surface ($\alpha$) of the resin layer, as the crosslinking agent (B), both a metal chelate crosslinking agent and an epoxy crosslinking agent are preferably contained, and both an aluminum chelate crosslinking agent and an epoxy crosslinking agent are preferably contained.

The content of the crosslinking agent (B) is preferably 0.01 to 15 parts by mass, more preferably 0.1 to 10 parts by mass, and still more preferably 0.3 to 7.0 parts by mass relative to 100 parts by mass of the acrylic resin (A) in the aforementioned acrylic pressure sensitive adhesive.

In the case where a metal chelate crosslinking agent and an epoxy crosslinking agents are used in combination, the content ratio of the metal chelate crosslinking agent to the epoxy crosslinking agent [(metal chelate crosslinking agent)/(epoxy crosslinking agent)] is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

The acrylic pressure sensitive adhesive may contain any ordinary additive within a range where the effects of the present invention are not impaired. Examples of the ordinary additive include those as described above, and the content of the ordinary additive is also as described above.

The acrylic pressure sensitive adhesive to be used in one embodiment of the present invention may contain any other pressure sensitive adhesive resin than the acrylic resin (A) (for example, a urethane resin, a rubber resin, a silicone resin, etc.) within a range where the effects of the present invention are not imp aired.

The content of the acrylic resin (A) in the acrylic pressure sensitive adhesive is preferably 50 to 100% by mass, more preferably 70 to 100% by mass, still more preferably 80 to 100% by mass, and yet still more preferably 100% by mass relative to the total amount (100% by mass) of the pressure sensitive adhesive resin contained in the acrylic pressure sensitive adhesive.

<Particle Part (Y)>

The particle part (Y) constituting the aforementioned resin layer is consisting of fine particles.

From the viewpoints of improving the air escape property, improving the appearance, and improving the blister resistance in the pressure sensitive adhesive sheet and from the viewpoint of facilitating the formation of plural concave portions satisfying the aforementioned requirements (I) and (II) on the surface ($\alpha$) of the resin layer to be formed, an average particle diameter of the fine particles is preferably 0.01 to 100 μm, more preferably 0.05 to 25 μm, and still more preferably 0.1 to 10 μm.

It is preferred that a volume average secondary particle diameter of the fine particles constituting the particle part (Y) is preferably 1 to 70% of the thickness of the aforementioned resin layer. When the volume average secondary particle diameter of the fine particles is 1% or more of the thickness of the aforementioned resin layer, the fine particles are appropriately disposed in the resin layer, and therefore, by partially differentiating the cohesive strength of the resin layer, the resin layer is readily cloven in the drying step, resulting in facilitating the self-formation of the concave portions. In addition, when the volume average secondary particle diameter of the fine particles is 70% or less of the thickness of the resin layer, the particles can be hardly exposed on the surface of the resin layer, so that a lowering of the pressure sensitive adhesive strength can be suppressed. The volume average secondary particle diameter of the fine particles is preferably a particle diameter of 2 to 50%, more preferably a particle diameter of 3 to 30%, still more preferably a particle diameter of 4 to 20%, and yet still more preferably a particle diameter of 5 to 15% of the thickness of the resin layer.

The value of the volume average secondary particle diameter of the fine particles can be determined through measurement of particle size distribution according to the Coulter counter method using Multisizer III or the like, or other methods. In addition, the thickness of the resin layer can be measured by using a constant pressured thickness measuring instrument (manufactured by TECLOCK Corporation, a product name: "PG-02J") or the like in conformity with JIS K7130:1999.

The fine particles to be used in one embodiment of the present invention are not particularly limited, and examples thereof include inorganic particles, such as silica particles, metal fine particles, metal oxide particles, minerals (for example, smectite or bentonite), barium sulfate, calcium carbonate, magnesium carbonate, aluminum hydroxide, aluminum silicate, calcium silicate, glass beads, etc.; organic particles, such as acrylic beads, etc.; and the like.

The metal as referred to in the present invention refers to a particle composed of an element belonging to the Group 1 (exclusive of H), the Groups 2 to 11, the Group 12 (exclusive of Hg), the Group 13 (exclusive of B), the Group 14 (exclusive of C and Si), the group 15 (exclusive of N, P, As, and Sb), or the Group 16 (exclusive of O, S, Se, Te, and To) of the periodic table.

Examples of the metal oxide particles include particles composed of a metal oxide selected from titanium oxide, alumina, boehmite, chromium oxide, nickel oxide, copper oxide, titanium oxide, zirconium oxide, indium oxide, zinc oxide, and complex oxides thereof; and the like, and sol particles composed of these metal oxides are also included.

Examples of the smectite include montmorillonite, beidellite, hectorite, saponite, stevensite, nontronite, sauconite, and the like.

Among these fine particles, from the viewpoint of blister resistance, one or more selected from silica particles, metal oxide particles, and smectite are preferred; one or more selected from silica particles, alumina, boehmite, and smectite are more preferred; one or more selected from silica particles, alumina, boehmite, and hectorite are still more preferred; and silica particles are yet still more preferred.

The silica particles to be used in one embodiment of the present invention may be any one of dry type silica and wet type silica.

The silica particles to be used in one embodiment of the present invention may also be an organic modified silica having been surface-modified with an organic compound having a reactive functional group or the like, an inorganic modified silica having been surface-treated with an inorganic compound, such as sodium aluminate, sodium hydroxide, etc.; an organic/inorganic modified silica having been surface-treated with any of these organic compounds and inorganic compounds, or an organic/inorganic modified silica having been surface-treated with an organic/inorganic hybrid material of a silane coupling agent, etc.; and the like.

These silica particles may also be in the form of a mixture of two or more thereof.

The mass concentration of silica in the silica particles is preferably 50 to 100% by mass, more preferably 60 to 100% by mass, still more preferably 70 to 100% by mass, yet still more preferably 85 to 100% by mass, and even yet still more preferably 90 to 100% by mass relative to the total amount (100% by mass) of the silica particles.

From the viewpoint of improving the air escape property, the appearance, and the blister resistance of the pressure sensitive adhesive sheet and from the viewpoint of facilitating the formation of plural concave portions satisfying the aforementioned requirements (I) and (II) on the surface (α) of the resin layer, the volume average secondary particle diameter of the fine particles to be used in one embodiment of the present invention is preferably 50 µm or less, more preferably m or less, still more preferably 10 µm or less, yet still more preferably 8 µm or less, and even yet still more preferably 5 µm or less, and preferably 0.5 µm or more, more preferably 1 µm or more, and still more preferably 1.5 µm or more.

In the present invention, the value of the volume average secondary particle diameter of the silica particles is a value determined through measurement of particle size distribution according to the Coulter counter method using Multisizer III (manufactured by Beckman Coulter Inc.) or the like.

In particular, in the case where the fine particles are silica particles, a suitable range of the volume average secondary particle diameter thereof is the same as the suitable range of the aforementioned fine particles. Above all, the volume average secondary particle diameter is 10 µm or less, more preferably 8 µm or less, and still more preferably 5 µm or less, and preferably 0.5 µm or more, more preferably 1 µm or more, and still more preferably 1.5 µm or more. In addition, the volume average secondary particle diameter is preferably 0.5 to 10 µm, more preferably 1 to 8 µm, and still more preferably 1.5 to 5 µm.

The mass retention rate after heating the resin layer which the pressure sensitive adhesive sheet that is one embodiment of the present invention has at 800° C. for 30 minutes is preferably 3 to 90% by mass, more preferably 5 to 80% by mass, still more preferably 7 to 70% by mass, and yet still more preferably 9 to 60% by mass.

The mass retention rate can be considered to indicate the content (% by mass) of the fine particles to be contained in the resin layer.

When the mass retention rate is 3% by mass or more, a pressure sensitive adhesive sheet which is excellent in air escape property and blister resistance may be provided. In addition, in production of the pressure sensitive adhesive sheet that is one embodiment of the present invention, plural concave portions satisfying the aforementioned requirements (I) and (II) are readily formed on the surface (α) of the resin layer to be formed. On the other hand, when the mass retention rate is 90% by mass or less, a pressure sensitive adhesive sheet in which the film strength of the resin layer is high and which is excellent in appearance, water resistance, and chemical resistance may be provided.

[Release Material]

As one embodiment of the pressure sensitive adhesive sheet of the present invention, a release material may be additionally provided on the aforementioned resin layer. As the release material to be used, a release sheet having both surfaces subjected to a release treatment, a release sheet having one surface subjected to a release treatment, and the like are usable, and examples thereof include a substrate for the release material having a release agent coated thereon, and the like. The release-treated face is preferably a flat release material without a relief shape formed thereon (for example, a release material having no embossed pattern formed thereon).

Examples of the substrate for the release material include the paper substrate, the resin film or sheet, and the substrate resulting from lamination of a paper substrate with a resin as described above, each of which is used as the substrate of the pressure sensitive adhesive sheet of one embodiment of the present invention, and the like.

Examples of the release agent include a rubber elastomer, such as a silicone resin, an olefin resin, an isoprene resin, a butadiene resin, etc., a long-chain alkyl resin, an alkyd resin, a fluorine resin, and the like.

Though the thickness of the release material is not particularly limited, it is preferably 10 to 200 μm, more preferably 25 to 170 μm, and still more preferably 35 to 80 μm.

[Production Method of Pressure Sensitive Adhesive Sheet]

Next, a production method of the pressure sensitive adhesive sheet of the present invention is hereunder described.

Thought the production method of the pressure sensitive adhesive sheet of the present invention is not particularly limited, from the viewpoint of productivity and from the viewpoint of facilitating the formation of plural concave portions satisfying the aforementioned requirements (I) and (II) on the surface (α) of the resin layer to be formed, a method including at least the following steps (1) and (2) is preferred.

Step (1): A step of forming a coating film (x') formed by a composition (x) containing a resin as a main component and a coating film (y') formed by a composition (y) containing the fine particles in an amount of 15% by mass or more.

Step (2): A step of drying the coating film (x') and the coating film (y') formed in the step (1) simultaneously.

<Step (1)>

The step (1) is a step of forming a coating film (x') formed by a composition (x) containing a resin as a main component and a coating film (y') formed by a composition (y) containing the fine particles in an amount of 15% by mass or more.

The composition (x) is a forming material for the resin part (X), and it preferably contains a crosslinking agent together with the aforementioned resin and may further contain the aforementioned ordinary additive.

Though the composition (y) is a forming material for the particle part (Y), it may further contain a resin, a crosslinking agent, and the aforementioned ordinary additive. The composition (y) containing those components, such as a resin, etc., also serves as the forming material for the resin part (X).

(Composition (x))

Examples of the resin to be contained in the composition (x) include a resin constituting the aforementioned resin part (X), and the resin is preferably a pressure sensitive adhesive resin having a functional group, more preferably the aforementioned acrylic resin (A) having a functional group, and still more preferably the aforementioned acrylic copolymer (A1).

The content of the resin in the composition (x) is typically 40% by mass or more, preferably 50% by mass or more, more preferably 65% by mass or more, still more preferably 75% by mass or more, yet still more preferably 85% by mass or more, and even yet still more preferably 90% by mass or more, and preferably 100% by mass or less, and more preferably 95% by mass or less, relative to the total amount (100% by mass (but excluding diluent solvent)) of the composition (x).

Examples of the crosslinking agent to be contained in the composition (x) include the crosslinking agent to be contained in the aforementioned resin part (X). One or more selected from a metal chelate crosslinking agent and an epoxy crosslinking agent are preferably contained, a metal chelate crosslinking agent is more preferably contained, and an aluminum chelate crosslinking agent is still more preferably contained.

From the viewpoint of bettering the shape retentivity of the plural concave portions on the surface (α) of the resin layer to be formed, the resin part (X) preferably contains both a metal chelate crosslinking agent and an epoxy crosslinking agent, and more preferably contains both an aluminum chelate crosslinking agent and an epoxy crosslinking agent.

In the case where the composition (x) contains both a metal chelate crosslinking agent and an epoxy crosslinking agent, the content ratio of the metal chelate crosslinking agent to the epoxy crosslinking agent in the composition (x) [(metal chelate crosslinking agent)/(epoxy crosslinking agent)] is preferably 10/90 to 99.5/0.5, more preferably 50/50 to 99.0/1.0, still more preferably 65/35 to 98.5/1.5, and yet still more preferably 75/25 to 98.0/2.0 in terms of a mass ratio.

The content of the crosslinking agent is preferably 0.01 to 15 parts by mass, more preferably 0.1 to 10 parts by mass, and still more preferably 0.3 to 7.0 parts by mass relative to 100 parts by mass of the resin to be contained in the composition (x).

The composition (x) is preferably an acrylic pressure sensitive adhesive containing the aforementioned acrylic resin (A) having a functional group and crosslinking agent (B), more preferably an acrylic pressure sensitive adhesive containing the aforementioned acrylic copolymer (A1) and crosslinking agent (B).

The details of the aforementioned acrylic pressure sensitive adhesive are as described above.

Though the composition (x) may contain the aforementioned fine particles, the content of the fine particles is less than 15% by mass and is smaller than the content of the resin to be contained in the composition (x).

Specifically, the content of the fine particles is less than 15% by mass, preferably 0 to 13% by mass, more preferably 0 to 10% by mass, still more preferably 0 to 5% by mass, and yet still more preferably 0% by mass relative to the total amount (100% by mass (but excluding diluent solvent)) of the composition (x).

(Composition (y))

The composition (y) is a forming material for the particle part (Y) and contains at least the aforementioned fine particles in an amount of 15% by mass or more. From the viewpoint of dispersibility of the fine particles, the composition (y) preferably contains a resin together with the fine particles, and more preferably further contains a crosslinking agent together with the resin. In addition, the composition (y) may contain an ordinary additive.

These resin, crosslinking agent, and ordinary additive serve as the forming material for the resin part (X).

Examples of the fine particles to be contained in the composition (y) include those as described above, and from the viewpoint of forming the void part (Z) in the resin layer to provide a pressure sensitive adhesive sheet having improved blister resistance, one or more selected from silica particles, metal oxide particles, and smectite are preferred.

From the viewpoint of facilitating the formation of irregular concave portions on the surface (α) of the resin layer through self-formation of the resin layer, the content of the fine particles in the composition (y) is 15% by mass or more, preferably 20 to 100% by mass, more preferably 25 to 90% by mass, still more preferably 30 to 85% by mass, and yet still more preferably 35 to 80% by mass relative to the total amount (100% by mass (but excluding diluent solvent)) of the resin composition (y).

Examples of the resin to be contained in the composition (y) include the same resins as those of the resin to be contained in the aforementioned composition (x), and it is preferred that the same resin as in the composition (x) is contained. These resins may be used either alone or in combination of two or more thereof.

More specifically, the resin to be contained in the composition (y) is preferably a resin having a functional group, more preferably the aforementioned acrylic resin (A) having a functional group, and still more preferably the aforementioned acrylic copolymer (A1).

The content of the resin in the composition (y) is typically 0 to 85% by mass, preferably 1 to 80% by mass, more preferably 5 to 75% by mass, still more preferably 10 to 70% by mass, and yet still more preferably 20 to 65% by mass relative to the total amount (100% by mass (but excluding diluent solvent)) of the composition (y).

Examples of the crosslinking agent to be contained in the composition (y) include the crosslinking agent to be contained in the aforementioned resin part (X). One or more selected from a metal chelate crosslinking agent and an epoxy crosslinking agent are preferably contained, and a metal chelate crosslinking agent is more preferably contained. In addition, both a metal chelate crosslinking agent and an epoxy crosslinking agent are still more preferably contained. In addition, an aluminum chelate crosslinking agent is preferred as the metal chelate crosslinking agent.

In the case where the composition (y) contains both a metal chelate crosslinking agent and an epoxy crosslinking agent, a suitable range of the content ratio (mass ratio) of the metal chelate crosslinking agent to the epoxy crosslinking agent is the same as in the aforementioned composition (x).

The content of the crosslinking agent is preferably 0.01 to 15 parts by mass, more preferably 0.1 to 10 parts by mass, and still more preferably 0.3 to 7.0 parts by mass relative to 100 parts by mass of the resin to be contained in the composition (y).

(Formation Method of Coating Films (x') and (y'))

For facilitating the formation of a coating film, it is preferred that a solvent is blended in the composition (x) or (y) to give a solution of the composition.

Examples of the solvent include water, organic solvents, and the like.

Examples of the organic solvent include toluene, ethyl acetate, butyl acetate, methyl ethyl ketone, methyl isobutyl ketone, methanol, ethanol, isopropyl alcohol, t-butanol, sec-butanol, acetylacetone, cyclohexanone, n-hexane, cyclohexane, and the like. These solvents may be used either alone or in combination of two or more thereof.

Though the order of laminating the coating films (x') and (y') to be formed in this step is not particularly limited, it is preferred that the coating film (x') is laminated on the coating film (y').

Regarding the formation method of the coating films (x') and (y'), there may be employed a successive formation method of forming a coating film (y') and then forming a coating film (x') on the coating film (y'), or from the viewpoint of productivity, there may also be employed a simultaneous coating method of coating with both the coating film (y') and the coating film (x') using a multilayer coater.

Examples of the coater for use in successive formation include a spin coater, a spray coater, a bar coater, a knife coater, a roll coater, a knife roll coater, a blade coater, a gravure coater, a curtain coater, a die coater, and the like.

Examples of the coater for use in simultaneous coating with a multilayer coater include a curtain coater, a die coater, and the like, and among these, a die coater is preferred from the viewpoint of operability.

In this step (1), after the formation of at least one of the coating film (x') and the coating film (y') and prior to the step (2), a pre-drying treatment may be carried out in such a degree that the curing reaction of the coating film does not proceed.

Though the drying temperature in the pre-drying treatment in this step (1) is generally set within a temperature range in which the formed coating film is not cured, it is preferably lower than the drying temperature in the step (2). A specific drying temperature as prescribed in terms of the "lower than the drying temperature in the step (2)" is preferably 10 to 45° C., more preferably 10 to 34° C., and still more preferably 15 to 30° C.

<Step (2)>

The step (2) is a step of drying the coating film (x') and the coating film (y') formed in the step (1) simultaneously.

In this step, the coating film (x') and the coating film (y') formed are dried simultaneously, whereby a resin layer containing the resin part (X) and the particle part (Y) is formed, and in addition, plural concave portions are formed on the surface (α) of the resin layer.

From the viewpoint of facilitating the formation of plural concave portions satisfying the aforementioned requirements (I) and (II), the drying temperature in this step is preferably 35 to 200° C., more preferably 60 to 180° C., still more preferably 70 to 160° C., and yet still more preferably 80 to 140° C.

When the drying temperature is 35° C. or higher, a pressure sensitive adhesive sheet having good air escape property can be obtained. On the other hand, when the drying temperature is 200° C. or lower, the substrate and the release material which the pressure sensitive adhesive sheet has can be made free from trouble of shrinkage thereof.

When the drying temperature is lower, the height difference of the concave portions to be formed becomes large, but the number of concave portions to be formed tends to decrease.

In the surroundings of the particle part (Y) of the resin layer to be formed in this step, a void part (Z) is readily formed.

The void part (Z) can be readily formed by using one or more selected from silica particles, metal oxide particles, and smectite as the fine particles to be contained in the aforementioned composition (y).

In the case of producing a pressure sensitive adhesive sheet having a resin layer having a multilayer structure in which a layer (Xβ) mainly containing the resin part (X), a layer (Y1) containing the particle part (Y) in an amount of 15% by mass or more, and a layer (Xα) mainly containing the resin part (X) are laminated in this order, like in the pressure sensitive adhesive sheet 1a of FIG. 1(a), etc. a production method of the following first and second embodiments is preferred.

In the description of the production method of the following first and second embodiments, the "composition (xβ) or (xα) containing a resin as a main component" is the same as the aforementioned composition (x), and the details of the respective components to be contained in the composition (xβ) or (xα) (kind of the component, preferred components, content of the component, etc.) are also the same. The "composition (y) containing fine particles in an amount of 15% by mass or more" is also as described above.

Production Method of First Embodiment

The production method of the first embodiment includes at least the following steps (1A) and (2A).

Step (1A): A step of forming, on a release material or a substrate having a bending stress coefficient k in the MD direction of 20 N·mm or less and a 10% elongation strength in the MD direction of 260 N/15 mm or less, a coating film (xβ') formed by a composition (xβ) containing a resin as a main component, a coating film (y') formed by a composition (y) containing the fine particles in an amount of 15% by mass or more, and a coating film (xα') formed by a composition (xα) containing a resin as a main component, by laminating in this order.

Step (2A): A step of drying the coating film (xβ'), the coating film (y'), and the coating film (xα') formed in the step (1A) simultaneously.

In the step (1A), it is also preferred that the aforementioned solvent is blended in the composition (xβ), the composition (y), and the composition (xα) to form solutions of the respective compositions, and the resultant solutions are used for coating.

Regarding the formation method of the coating film (xβ'), the coating film (y'), and the coating film (xα'), there may be employed a successive formation method of forming a coating film (xβ') on a substrate or a release material, then forming a coating film (y') on the coating film (xβ'), and further forming a coating film (xα') on the coating film (y'), by using the aforementioned coater, or a simultaneous coating method of forming a coating film (xβ'), a coating film (y'), and a coating film (xα') by using the aforementioned multilayer coater.

In the step (1A), after formation of one or more coating films of the coating film (xβ'), the coating film (y'), and the coating film (xα') and prior to the step (2A), a pre-drying treatment may be carried out in such a degree that the curing reaction of the coating films does not proceed.

For example, after formation of the coating film (xβ'), the coating film (y'), and the coating film (xα'), such a pre-drying treatment may be carried out every time after the formation, or after the formation of the coating film (xβ') and the coating film (y'), the two may be subjected to the aforementioned pre-drying treatment all together, and then the coating film (xα') may be formed thereon.

In this step (1A), though the drying temperature for the pre-drying treatment is generally so set as to fall within a temperature range in such a degree that curing of the formed coating film does not proceed, it is preferably lower than the drying temperature in the step (2A). A specific drying temperature as prescribed in terms of the "lower than the drying temperature in the step (2A)" is preferably 10 to 45° C., more preferably 10 to 34° C., and still more preferably 15 to 30° C.

The step (2A) is a step of drying the coating film (xβ'), the coating film (y'), and the coating film (xα') formed in the step (1A), simultaneously. The preferred range of the drying temperature in this step is the same as that in the aforementioned step (2). In this step, a resin layer containing the resin part (X) and the particle part (Y) is formed.

Production Method of Second Embodiment

The production method of the first embodiment includes at least the following steps (1B) and (2B).

Step (1B): A step of forming, on a layer (Xβ) mainly containing the resin part (X) that is provided on the release material or the substrate having a bending stress coefficient k in the MD direction of 20 N·mm or less and a 10% elongation strength in the MD direction of 260 N/15 mm or less, a coating film (y') formed by a composition (y) containing the fine particles in an amount of 15% by mass or more and a coating film (xα') formed by a composition (xα) containing a resin as a main component, by laminating in this order.

Step (2B): A step of drying the coating film (y') and the coating film (xα') formed in the step (1B) simultaneously.

In the step (1B), the "layer (Xβ) mainly containing a resin part (X)" can be formed by drying the aforementioned coating film (xβ') formed by a composition (xβ) containing a resin as a main component.

The layer (Xβ) is formed of the composition (xβ), and therefore, the layer (Xβ) may contain a crosslinking agent, an ordinary additive, and others in addition to the resin. The content of the resin part (X) in the layer (Xβ) is as described above.

Regarding the formation method of the layer (Xβ), it is possible to form the layer (Xβ) in a manner that a coating film (xβ') formed by a composition (xβ) containing a resin as a main component is formed on the substrate or the release material, and the coating film (xβ') is then dried.

The drying temperature at this time is not particularly limited, and it is preferably 35 to 200° C., more preferably 60 to 180° C., still more preferably 70 to 160° C., and yet still more preferably 80 to 140° C.

This embodiment differs from the aforementioned first embodiment in that the coating film (y') and the coating film (xα') are formed in this order on the layer (Xβ) formed by drying, but not on the coating film (xβ').

In the step (1B), it is also preferred that the aforementioned solvent is blended in the composition (y) and the composition (xα) to form solutions of the respective compositions, and thereafter, the solutions are used for coating.

Regarding the formation method of the coating film (y') and the coating film (xα'), there may be employed a successive formation method of forming a coating film (y') on the layer (Xβ) and then forming a coating film (xα') on the coating film (y'), by using the aforementioned coater, or a simultaneous coating method of coating with both the coating film (y') and the coating film (xα') by using the aforementioned multilayer coater.

In this step (1B), after formation of the coating film (y') or after formation of the coating film (y') and the coating film (xα') and prior to the step (2B), a pre-drying treatment may be carried out in such a degree that the curing reaction of the coating films does not proceed.

In this step (1B), though the drying temperature for the pre-drying treatment is generally so set as to fall within a temperature range in such a degree that curing of the formed coating film does not proceed, it is preferably lower than the drying temperature in the step (2B). A specific drying temperature as prescribed in terms of the "lower than the drying temperature in the step (2B)" is preferably 10 to 45° C., more preferably 10 to 34° C., and still more preferably 15 to 30° C.

The step (2B) is a step of drying the coating film (y') and the coating film (xα') formed in the step (1B) simultaneously, and the preferred range of the drying temperature in this step is the same as in the aforementioned step (2). In this step, a resin layer containing the resin part (X) and the particle part (Y) is formed.

In the aforementioned production method, in the case of forming the resin layer on the release material (hereinafter also referred to as "first release material"), a method in which after forming the resin layer, the foregoing resin layer is attached to another release material (hereinafter also referred to as "second release material"), the first release material is then removed, and the exposed resin layer is attached to the substrate satisfying the aforementioned requirements may be employed.

[Use Method of Pressure Sensitive Adhesive Sheet]

The pressure sensitive adhesive sheet that is one embodiment of the present invention is favorable in all of the air escape property, the appearance, and the folding attaching property, and therefore, it can be suitably used for, for example, painting-alternate tapes, marking films, and vehicle attachment tapes (for example, decorative tapes or blackout tapes for decorating the exterior or interior of an automobile, etc.). In particular, the pressure sensitive adhesive sheet that is one embodiment of the present invention is useful as a tape to be used when attached to the shape face having a folding portion of a vehicle or the like, from the standpoint of favorable appearance and folding attaching property.

On using the pressure sensitive adhesive sheet that is one embodiment of the present invention, a method which is generally used on attaching the tape to a targeted adherend can be employed. Though the method of use is not particularly limited, for example, a method in which the face in which the surface (α) of the aforementioned resin layer is exposed is attached to the adherend and press-attached while escaping the air between the surface (α) and the adherend with a squeegee or the like can be employed.

EXAMPLES

The present invention is described more specifically with reference to the following Examples, but it should be construed that the present invention is not limited to the following Examples. The physical property values in the following Production Examples and Examples are values measured by the following methods.

<Mass Average Molecular Weight (Mw) of Resin>

The measurement was performed by using a gel permeation chromatography instrument (manufactured by Tosoh Corporation, a product name: "HLC-8020) under the following conditions, and a value measured as the standard polystyrene conversion was used.

(Measurement Condition)

Column: "TSK guard column HXL-L", "TSK gel G2500HXL", "TSK gel G2000HXL", and "TSK gel G1000HXL" (all manufactured by Tosoh Corporation), connected in series Column temperature: 40° C.

Developing solvent: tetrahydrofuran

Flow rate: 1.0 mL/min

<Volume Average Secondary Particle Diameter of Silica Particles>

The volume average secondary particle diameter of the silica particles was determined by measuring the particle size distribution with Multisizer III (manufactured by Beckman Coulter Inc.) by the Coulter Counter method.

Production Examples 1 to 3

(Preparation of Solutions (x-1) to (x-3) of Resin Composition)

To 100 parts by mass of a solution of an acrylic resin having the kind and the solid content shown in Table 1, a crosslinking agent and a diluent solvent, each having the kind and the blending amount shown in Table 1, were added, thereby preparing solutions (x-1) to (x-3) of a resin composition each having the solid content shown in Table 1.

The details of the respective components shown in Table 1 as used for the preparation of the solutions (x-1) to (x-3) of a resin composition are as follows.

<Solution of Acrylic Resin>

Solution (i): A mixed solution of toluene and ethyl acetate containing an acrylic resin (x-i) (an acrylic copolymer having structural units derived from butyl acrylate (BA) and acrylic acid (AA), BA/AA=90/10 (% by mass), Mw: 630,000) having a solid concentration of 34.0% by mass.

Solution (ii): A mixed solution of toluene and ethyl acetate containing an acrylic resin (x-ii) (an acrylic copolymer having structural units derived from butyl acrylate (BA) and acrylic acid (AA), BA/AA=90/10 (% by mass), Mw: 460,000) having a solid concentration of 37.0% by mass.

Solution (iii): A mixed solution of ethyl acetate, hexane, and acetone containing an acrylic resin (x-iii) (an acrylic copolymer having structural units derived from butyl acrylate (BA), vinyl acetate (VAc), and acrylic acid (AA), BA/VAc/AA=85/10/5 (% by mass), Mw: 370,000) having a solid concentration of 43.0% by mass.

<Crosslinking Agent>

Aluminum chelate crosslinking agent: Product name "M-5A", manufactured by Soken Chemical & Engineering Co., Ltd., solid concentration=4.95% by mass Epoxy crosslinking agent: A solution of an epoxy crosslinking agent obtained by diluting "TETRAD (registered trademark)-C" (a product name, manufactured by Mitsubishi Gas Chemical Co., Inc.) with toluene to make a solid concentration of 5% by mass <Diluent Solvent>

IPA: Isopropyl alcohol

Mixed solvent (I): A mixed solvent composed of a mixture of ethyl acetate and isopropyl alcohol (IPA) (ethyl acetate/IPA=49/51 (mass ratio))

TABLE 1

| | Aluminum chelate crosslinking agent ("M-5A". solid concentration: 4.95% by mass) |
|---|---|

TABLE 1-continued

| Solution of resin composition | Solution of acrylic resin | | Blending amount (parts by mass) | Blending amount of solid (parts by mass) | Blending amount (parts by mass) | Blending amount of solid (parts by mass) | Solid content relative to 100 parts by mass of acrylic resin (parts by mass) |
|---|---|---|---|---|---|---|---|
| | Kind | Kind of resin | | | | | |
| Production Example 1 | Solution (i) | Acrylic resin (x-i) [BA/AA = 90/10 (wt %), Mw = 630,000] | 100 | 34.0 | 2.53 | 0.13 | 0.37 |
| Production Example 2 | Solution (ii) | Acrylic resin (x-ii) [BA/AA = 90/10 (wt %), Mw = 460,000] | 100 | 37.0 | 2.75 | 0.14 | 0.37 |
| Production Example 3 | Solution (iii) | Acrylic resin (x-iii) [BA/VAc/AA = 85/10/5 (wt %), Mw = 370,000] | 100 | 43.0 | 4.50 | 0.22 | 0.52 |

| | Epoxy crosslinking agent ("TETRAD-C"), solid concentration: 5% by mass | | | | |
|---|---|---|---|---|---|
| | Blending amount (parts by mass) | Blending amount of solid (parts by mass) | Solid content relative to 100 parts by mass of acrylic resin (parts by mass) | Diluent solvent Kind | Solid concentration of solution of resin composition (mass %) |
| Production Example 1 | 0.38 | 0.02 | 0.06 | Mixed solvent (I) | 24 |
| Production Example 2 | 0.40 | 0.02 | 0.05 | Mixed Solvent (I) | 24 |
| Production Example 3 | 0.30 | 0.02 | 0.03 | IPA | 34 |

Production Example 4

(Preparation of Fine Particle Dispersion Liquid (f-1))

To 100 parts by mass of a solution (solid content: 33.6 parts by mass) of an acrylic resin (a mixed solution of toluene and ethyl acetate containing an acrylic copolymer having structural units derived from butyl acrylate (BA) and acrylic acid (AA) (BA/AA=90/10 (% by mass), Mw: 470,000) and having a solid concentration of 33.6% by mass), 50.4 parts by mass (solid content: 50.4 parts by mass) of silica particles (a product name: "Nipsil E-200A", manufactured by Tosoh Silica Corporation, volume average secondary particle diameter: 3 μm) as fine particles and toluene were added, and the fine particles were dispersed, thereby preparing a fine particle dispersion liquid (f-1) having a solid concentration of 27% by mass containing the acrylic resin and the silica particles.

Production Example 5

(Preparation of Fine Particle Dispersion Liquid (f-2))

To 100 parts by mass of a solution (solid content: 33.6 parts by mass) of an acrylic resin (a mixed solution of toluene and ethyl acetate containing an acrylic copolymer having structural units derived from butyl acrylate (BA) and acrylic acid (AA) (BA/AA=90/10 (% by mass), Mw: 470,000) and having a solid concentration of 33.6% by mass), 50.4 parts by mass (solid content: 50.4 parts by mass) of silica particles (a product name: "Nipsil E-200A", manufactured by Tosoh Silica Corporation, volume average secondary particle diameter: 3 μm) as fine particles and toluene were added, and the fine particles were dispersed, thereby preparing a fine particle dispersion liquid (f-2) having a solid concentration of 30% by mass containing the acrylic resin and the silica particles.

Production Example 6

(Preparation of Coating Liquid (y-1) for Forming Coating film (y'))

To the fine particle dispersion liquid (f-1) prepared in Production Example 4 having a blending amount (solid amount) shown in Table 2, a solution of an acrylic resin, a crosslinking agent, and a diluent solvent, each having the kind and blending amount shown in Table 2, were added, thereby preparing a coating liquid (y-1) for forming coating film (y') having a solid concentration shown in Table 2.

Production Example 7

(Preparation of Coating Liquid (y-2) for Forming Coating Film (y'))

To the fine particle dispersion liquid (f-2) prepared in Production Example 5 having a blending amount (solid amount) shown in Table 2, a solution of an acrylic resin, a crosslinking agent, and a diluent solvent, each having the kind and blending amount shown in Table 2, were added, thereby preparing a coating liquid (y-2) for forming coating film (y') having a solid concentration shown in Table 2.

The details of the respective components shown in Table 2 used for the preparation of the coating liquids (y-1) and (y-2) for forming coating film (y') are as follows.

<Diluent Solvent>

Mixed solvent (II): A mixed solvent composed of isopropyl alcohol (IPA) and cyclohexanone (IPA/cyclohexanone=95/5 (mass ratio))

Mixed solvent (III): A mixed solvent composed of isopropyl alcohol (IPA) and cyclohexanone (IPA/cyclohexanone=60/40 (mass ratio))

TABLE 2

| | Coating liquid for forming coating film (y') | Fine particle dispersion liquid prepared in Production Example 4 or 5 | | | Solution of acrylic resin | | | |
|---|---|---|---|---|---|---|---|---|
| | | Fine particle dispersion liquid | Blending amount (parts by mass) | Blending amount of solid (parts by mass) | Content of fine particles (parts by mass) (*1) | Kind | Kind of resin | Blending amount (parts by mass) | Blending amount of solid (parts by mass) |
| Production Example 6 | (y-1) | (f-1) | 73.12 | 19.74 | 11.8 | Solution (i) | Acrylic resin (x-i) [BA/AA = 90/10 (wt %), Mw = 630,000] | 26.88 | 9.14 |
| Production Example 7 | (y-2) | (f-2) | 71.00 | 21.30 | 12.8 | Solution (iii) | Acrylic resin (x-iii) [BA/VAc/AA = 85/10/5 (wt %), Mw = 370,000] | 29.00 | 12.47 |

| | Aluminum chelate crosslinking agent ("M-5A", solid concentration: 4.95% by mass) | | | Epoxy crosslinking agent ("TETRAD-C"), solid concentration: 5% by mass) | | | | |
|---|---|---|---|---|---|---|---|---|
| | Blending amount (parts by mass) | Blending amount of solid (parts by mass) | Solid content relative to 100 parts by mass of acrylic resin (parts by mass) (*2) | Blending amount (parts by mass) | Blending amount of solid (parts by mass) | Solid content relative to 100 parts by mass of acrylic resin (parts by mass) (*2) | Diluent solvent Kind | Solid concentration of coating liquid for forming coating film (y') (mass %) | Concentration of fine particles in solid of coating liquid for forming coating film (y') (mass %) (*3) |
| Production Example 6 | 2.67 | 0.132 | 0.776 | 0.400 | 0.020 | 0.117 | Mixed solvent (II) | 24 | 41 |
| Production Example 7 | 0.54 | 0.027 | 0.127 | 0 | 0 | 0 | Mixed solvent (III) | 30 | 38 |

(*1): A value calculated according to {[blending amount of solid] × 50.4/(50.4 + 33.6)}
(*2): The "100 parts by mass of acrylic resin" is a value of {acrylic resin (solid) in the coating liquid} = {[solid of acrylic acid in the solution (blending aount)] + [acrylic resin in the fine particle dispersion liquid (exclusive of the content of fine particles (blending amount of solid)]}
(*3): A value calculated according to {[content of fine particles]/([blending amount of solid in the fine particle dispersion liquid] + [blending amount of solid in the solution of acrylic resin] + [blending amount of solid of aluminum chelate crosslinking agent] + [blending amount of solid in epoxy crosslinking agent]) × 100}

<Solution of Acrylic Resin>

Solution (i): A mixed solution of toluene and ethyl acetate containing the acrylic resin (x-i) in a solid concentration of 34.0% by mass (the details are as described above)

Solution (iii): A mixed solution of ethyl acetate, hexane, and acetone containing the acrylic resin (x-iii) in a solid concentration of 43.0% by mass (the details are as described above)

<Crosslinking Agent>

Aluminum crosslinking agent: Product name "M-5A", manufactured by Soken Chemical & Engineering Co., Ltd., solid concentration=4.95% by mass Epoxy crosslinking agent: A solution of an epoxy crosslinking agent obtained by diluting "TETRAD (registered trademark)-C" (a product name, manufactured by Mitsubishi Gas Chemical Co., Inc.) with toluene to make a solid concentration of 5% by mass Examples 1 to 11 and Comparative Example 1

On a release agent layer of a release film (manufactured by Lintec Corporation, a product name: "SP-PET381031", thickness: 38 μm, a PET film having a silicone release agent layer provided on one surface thereof) that is a first release material, the solution (x-1) of the resin composition prepared in Production Example 1, the coating liquid (y-1) for forming coating film (y') prepared in Production Example 6, and the solution (x-2) of the resin composition prepared in Production Example 2 were simultaneously coated in this order from the upper portion of the release agent layer with a multilayer die coater (width: 250 mm), thereby simultaneously forming a coating film (xβ'), a coating film (y'), and a coating film (xα'). The flow rate and coating speed of each of the solutions (coating liquids) for forming the coating film (xβ'), the coating film (y'), and the coating film (xα') are shown in Table 3.

Then, the three layers of the coating film (xβ'), the coating film (y'), and the coating film (xα') were simultaneously dried at a drying temperature of 100° C. for 2 minutes, thereby forming a resin layer containing a resin part (X) and a particle part (Y) having a thickness shown in Table 3. Then, lamination was performed in such a manner that on the surface (α) of the resin layer thus formed was attached a surface of a release agent layer of a release film (manufactured by Lintec Corporation, a product name: "SP-PET386040") that is a second release material, thereby producing a pressure sensitive adhesive sheet without a substrate.

Subsequently, after allowing to stand the pressure sensitive adhesive sheet without a substrate under an environment at 23° C. for one week, the first release material was removed, and the exposed surface (β) of the resin layer was attached to a surface of each of the substrates shown in Table 3, thereby producing a pressure sensitive adhesive sheet with a substrate.

In Example 6, though a PET film having an aluminum vapor deposition layer was used, the lamination was performed in such a manner that the surface (β) of the foregoing resin layer was attached to a surface of the aluminum vapor deposition layer.

Comparative Example 2

On a release agent layer of a release film (manufactured by Lintec Corporation, a product name: "SP-PET381031", thickness: 38 μm, a PET film having a silicone release agent layer provided on one surface thereof) that is a first release material, the solution (x-3) of the resin composition prepared in Production Example 3, the coating liquid (y-2) for forming coating film (y') prepared in Production Example 7, and the solution (x-3) of the resin composition prepared in Production Example 3 were simultaneously coated in this order from the upper portion of the release agent layer with a multilayer die coater (width: 250 mm), thereby simultaneously forming a coating film (xβ'), a coating film (y'), and a coating film (xα'). The flow rate and coating speed of each of the solutions (coating liquids) for forming the coating film (xβ'), the coating film (y'), and the coating film (xα') are shown in Table 3.

Then, the three layers of the coating film (xβ'), the coating film (y'), and the coating film (xα') were simultaneously dried at a drying temperature of 100° C. for 2 minutes, thereby producing a pressure sensitive adhesive sheet having a resin layer containing a resin part (X) and a particle part (Y) and having a thickness shown in Table 3.

Lamination was performed in such a manner that on the surface (α) of the resin layer thus formed was attached a surface of a release agent layer of a release film (manufactured by Lintec Corporation, a product name: "SP-PET386040") that is a second release material, thereby producing a pressure sensitive adhesive sheet without a substrate.

Subsequently, after allowing to stand this pressure sensitive adhesive sheet without a substrate under an environment at 23° C. for one week, the first release material was removed, and the exposed surface (β) of the resin layer was attached to a substrate shown in Table 3, thereby producing a pressure sensitive adhesive sheet with a substrate.

The kind of the substrate used for each of the pressure sensitive adhesive sheet produced in each of the Examples and Comparative Examples, and the configuration of the resin layer and the coating conditions are shown in the following Table 3.

The substrate used in each of the Examples and Comparative Examples as shown in Tables 3 and 4 are as follows.

Substrate No. 1: White polyvinyl chloride (PVC) film, a product name: "PVC 5000WM-3 (GI), manufactured by Okamoto Industries, Inc.

Substrate No. 2: White PVC film, a product name: "HIESPANT (registered trademark) M5011 White", manufactured by Nippon Carbide Industries, Co., Inc.

Substrate No. 3: Black non-PVC film, a product name: "ARTPLY (registered trademark) #100 SW001", manufactured by Mitsubishi Plastics, Inc.

Substrate No. 4: Black PVC film, a product name: "VINYBAN (registered trademark) BK0.09 63670", manufactured by Bando Chemical Industries, Ltd.

Substrate No. 5: While polyethylene terephthalate (PET) film, a product name: "LUMIRROR (registered trademark) E20 #50", manufactured by Toray Industries, Inc.

Substrate No. 6: Aluminum vapor deposition PET film (one obtained by subjecting one surface of a product name "LUMIRROR (registered trademark) T60 #50", manufactured by Toray Industries, Inc., to aluminum vapor deposition)

Substrate No. 7: PET film, a product name "LUMIRROR (registered trademark) T60 #38", manufactured by Toray Industries, Inc. ("LUMIRROR" products each having a different model number will be hereinafter those manufactured by Toray Industries, Inc.)

Substrate No. 8: PET film, a product name "LUMIRROR (registered trademark) T60 #50

Substrate No. 9: PET film, a product name "LUMIRROR (registered trademark) T60 #75

Substrate No. 10: PET film, a product name "LUMIRROR (registered trademark) T60 #100

Substrate No. 11: PET film, a product name "LUMIRROR (registered trademark) T60 #125

Substrate No. 12: PET film, a product name "LUMIRROR (registered trademark) T60 #188

Respective characteristics regarding the substrate and the resin layer used in the pressure sensitive adhesive sheet produced in each of the Examples and Comparative Examples as well as the pressure sensitive adhesive sheet were measured or observed by the following methods. The results are shown in Tables 3 and 4.

<Thickness h of Substrate and Thickness of Resin Layer (Total Thickness of Resin Layer)>

The thickness h of the substrate and the total thickness of the resin layer were each measured by using a constant pressured thickness measuring instrument, manufactured by TECLOCK Corporation (model number: "PG-02J", standard specification: in conformity with JIS K6783:1994, JIS Z1702:1994, and JIS Z1709:1995).

As for the total thickness of the resin layer, a value obtained by measuring the thickness of the resulting pressure sensitive adhesive sheet, from which was then subtracted a previously measured thickness h of the substrate, was employed.

TABLE 3

| | Substrate | | | Resin layer | | | | | | | Ratio of volume average secondary particle diameter of fine particles relative to total thickness of resin layer [%] |
|---|---|---|---|---|---|---|---|---|---|---|---|
| | | | | Coating film (xβ') | | Coating film (y') | | | Coating film (xα') | | Total thickness of resin layer [μm] |
| | Kind of substrate No. | Thickness [μm] | Coating speed [m/min] | Kind of solution | Coating flow rate of solution [g/min] | Kind of coating liquid | Kind of fine particle dispersion liquid (*1) | Coating flow rate of solution [g/min] | Kind of solution | Coating flow rate of solution [g/min] | |
| Example 1 | 1 | 50 | 5 | (x-1) | 54.9 | (y-1) | (f-1) | 44.0 | (x-2) | 59.0 | 30 | 10 |
| Example 2 | 2 | 50 | 5 | (x-1) | 54.9 | (y-1) | (f-1) | 44.0 | (x-2) | 59.0 | 31 | 10 |
| Example 3 | 3 | 98 | 5 | (x-1) | 54.9 | (y-1) | (f-1) | 44.0 | (x-2) | 59.0 | 30 | 10 |
| Example 4 | 4 | 90 | 5 | (x-1) | 54.9 | (y-1) | (f-1) | 44.0 | (x-2) | 59.0 | 30 | 10 |
| Example 5 | 5 | 50 | 5 | (x-1) | 54.9 | (y-1) | (f-1) | 44.0 | (x-2) | 59.0 | 29 | 10 |
| Example 6 | 6 | 50 | 5 | (x-1) | 54.9 | (y-1) | (f-1) | 44.0 | (x-2) | 59.0 | 32 | 9 |
| Example 7 | 7 | 38 | 5 | (x-1) | 54.9 | (y-1) | (f-1) | 44.0 | (x-2) | 59.0 | 30 | 10 |
| Example 8 | 8 | 50 | 5 | (x-1) | 54.9 | (y-1) | (f-1) | 44.0 | (x-2) | 59.0 | 29 | 10 |
| Example 9 | 9 | 75 | 5 | (x-1) | 54.9 | (y-1) | (f-1) | 44.0 | (x-2) | 59.0 | 31 | 10 |
| Example 10 | 10 | 100 | 5 | (x-1) | 54.9 | (y-1) | (f-1) | 44.0 | (x-2) | 59.0 | 30 | 10 |
| Example 11 | 11 | 125 | 5 | (x-1) | 54.9 | (y-1) | (f-1) | 44.0 | (x-2) | 59.0 | 31 | 10 |
| Comparative Example 1 | 12 | 188 | 5 | (x-1) | 54.9 | (y-1) | (f-1) | 44.0 | (x-2) | 59.0 | 30 | 10 |
| Comparative Example 2 | 1 | 50 | 5 | (x-3) | 87.2 | (y-2) | (f-2) | 85.0 | (x-3) | 41.0 | 51 | 6 |

(*1): Volume average secondary particle diameter of fine particles in fine particle dispersion liquid (f-1) or (f-2): 3 μm Respective characteristics regarding the substrate used for the pressure sensitive adhesive sheet produced in each of the Examples and Comparative Examples were measured by the following methods. The results are shown in the following Table 4.

<Young's Modulus E and Bending Stress Coefficient k of Substrate>

With respect to the substrate used in each of the Examples and Comparative Examples, its tensile elastic modulus was measured under the following conditions in conformity with JIS K7127:1999, and the measured value was defined as a Young's modulus E of the substrate.

In addition, the bending stress coefficient k of each substrate was calculated from the foregoing Young's modulus E and the value of the thickness h of the substrate as described above according to the following expression.

Bending stress coefficient $k$ of substrate=(Young's modulus $E$ of substrate)×(Thickness $h$ of substrate)$^3$ Measurement apparatus: "TENSILON (registered trademark) RTA-100, manufactured by Orientec Co., Ltd.
Width of test piece (type 2): 15 mm
Initial distance between chucks: 100 mm
Test speed: 200 mm/min <10% Elongation Strength of Substrate>

On measuring the aforementioned Young's modulus and bending stress coefficient of the substrate, a 10% elongation tensile strength (at the point of time at which the distance between chucks reached 110 mm) was measured, and the measured value was defined as a 10% elongation strength of the substrate.

With respect to the pressure sensitive adhesive sheet produced in each of the Examples and Comparative Examples, observation of concave portions on the surface (α), a mass retention rate of the resin layer of the pressure sensitive adhesive sheet, a proportion of the total area of the concave portions having a shape different from other concave portions, a ratio of the attached face area of the surface (α) to the adherend (attached face area ratio), each area and a maximum area of flat faces, a total area of flat faces were evaluated based on the following methods. The results are shown in Table 4.

<Observation of Concave Portions on Surface (α)>

In a specified region as prescribed in each of the requirements on the surface (α) of the resin layer of the pressure sensitive adhesive sheet produced in each of the Examples and Comparative Examples, whether or not the concave portions satisfying the following requirements (I) and (II) were formed was observed with a scanning electron microscope (manufactured by Hitachi, Ltd., a product name: "S-4700") or a digital microscope (manufactured by Keyence Corporation, a product name: "Digital Microscope VHX-5000").

In Table 4, the case where it was judged that the concave portions satisfying the respective requirements were formed is indicated as "A", and the case where the presence of the concave portions satisfying the respective requirements was not perceived is indicated as "F".

Requirement (I): Plural concave portions having a height difference of 0.5 m or more at maximum exist in a region (P) surrounded by a square having an edge length of 5 mm that is arbitrarily selected on the surface (α).

Requirement (II): One or more of the aforementioned concave portions exist in a region (U) surrounded by a square having an edge length of 600 μm that is arbitrarily selected on the surface (α).

With respect to the requirement (I), the observation was performed using the aforementioned scanning electron microscope at a magnification of 30 times. With respect to the value of the height difference of the concave portions existing in the region (P) surrounded by a square having an edge length of 5 mm that was arbitrarily selected on the surface (α), the observation of the cross section of the pressure sensitive adhesive sheet produced in each of the Examples and Comparative Examples by using the aforementioned scanning electron microscope at a magnification of 250 times. The "maximum height difference of concave portions" as measured herein refers to, for example, the length indicated with "h" relative to the concave portion 13 as shown in FIG. 2(*a*). In addition, in the case where the two concave portions 131 and 132 are continued as shown in FIG. 2(*b*), the length indicated with "h$_1$" relative to the concave portion 131 and the length indicated with "h$_2$" relative to the concave portion 132 were measured, respectively. In Table 4, the values of maximum height difference of the plural concave portions existing in the aforementioned region (P) were measured, respectively, and a maximum value of these measured values is shown as the "maximum value of height difference".

In addition, with respect to the requirement (II), the concave portions existing in the region (U) surrounded by a square having an edge length of 600 µm that was arbitrarily selected on the surface (α) were observed in the same manner as in the requirement (I).

Ten regions of the region (V) having an area of 8.93 mm$^2$ surrounded by a rectangle of 3.45 mm in long side and 2.59 mm in short side on the surface (α) of the resin layer of the pressure sensitive adhesive sheet produced in each of the Examples and Comparative Examples were arbitrarily selected, and with respect to the concave portions existing in the respective region (V), the presence or absence of any periodicity of the positions at which the concave portions existed was observed through visual inspection and with a digital microscope (magnification: 100 times). With respect to the shape of the concave portions, the number of concave portions, the confirmation on whether or not the positions at which the plural concave portions existed had no periodicity, and the shape of the flat face in the selected 10 regions, the observation and confirmation were also performed through visual inspection and with a digital microscope (magnification: 100 times).

<Mass Retention Rate of Resin Layer of Pressure Sensitive Adhesive Sheet>

In place of the aforementioned substrate, the resin layer was formed according to the method of each of the Examples and Comparative Examples on the surface of the release agent layer of a release film (manufactured by Lintec Corporation, a product name: "SP-PET381031", a PET film having a silicone release agent layer provided on one surface thereof, thickness: 38 µm), and the release film was then removed, thereby obtaining a sole resin layer.

After the mass of the resin layer before heating was measured, the resin layer was charged in a muffle furnace (manufactured by Denken Co., Ltd., a product name: "KDF-P90") and heated to 800° C. for 30 minutes. The resin layer after heating was measured for the mass thereof, and the mass retention rate of the resin layer was calculated according to the following expression.

Mass retention rate of resin layer (%)=(Mass of resin layer after heating)/(Mass of resin layer before heating)×100

<Proportion of Total Area of Concave Portions Having Shape Different from Other Concave Portions>

In the case of attaching the surface (α) of the resin layer of the pressure sensitive adhesive sheet produced in each of the Examples and Comparative Examples onto a smooth face of a translucent adherend according to the method shown in the following operations (i) to (iii), in the region (Vs) having an area of 8.93 mm$^2$ surrounded by a rectangle of 3.45 mm in long side and 2.59 mm in short side that was arbitrarily selected, a proportion of the total area of the concave portions having a shape different from other concave portions existing in the region (Vs) was measured, and the measured value was shown as "Proportion of total area of concave portions having shape different from other concave portions" in Table 4.

First of all, a configuration of FIG. 4 was prepared according to the following operation (i).

Operation (i): As shown in FIG. 4, the pressure sensitive adhesive sheet produced in each of the Examples and Comparative Examples was stationarily placed on a smooth face 100*a* of a translucent adherend 100 such that the surface (α) 12*a* of the resin layer 12 which the pressure sensitive adhesive sheet had was into contact therewith. A 2-kg roller (press-attaching apparatus as prescribed in JIS Z0237:2000 10.2.4) was reciprocated five times on the side of the substrate 11 of the pressure sensitive adhesive sheet, and attachment between the surface (α) 12*a* of the resin layer 12 and the smooth face 100*a* of the translucent adherend 100 was performed, thereby obtaining a laminate installed in the direction shown in FIG. 4.

As for the aforementioned translucent adherend, a no-alkali glass (a product name: "EAGLE XG (registered trademark)", manufactured by Corning Incorporated) was used as the "translucent adhered having a smooth face".

Subsequently, the proportion of the total area of the concave portions having a shape different from other concave portions was calculated according to the following operations (ii) and (iii).

Operation (ii): In the region (Vs) having an area of 8.93 mm$^2$ surrounded by a rectangle of 3.45 mm in long side and 2.59 mm in short side that was arbitrarily selected from the side of the translucent adherend 100 of the laminate obtained in the operation (i), an interface between the smooth face 100*a* of the translucent adherend 100 and the surface (α) 12*a* of the resin layer was photographed under the following photographing conditions from a W direction of FIG. 4 by using a digital microscope (manufactured by Keyence Corporation, a product name "Digital Microscope VHX-5000", high-resolution Zoom Lens VHX-ZST (100×), magnification: 100 times), thereby photographing a digital image of the selected region (Vs). In the region (Vs), digital images in four different regions were acquired. The photographing conditions at the time of photographing a digital image are shown below. The suitable photographing conditions differ depending upon the kind or color of the substrate which the pressure sensitive adhesive sheet has, and the environment of the apparatus. Therefore, though it is needed to properly select the conditions under which the attached face can be observed favorably, as an example of the photographing conditions, the conditions upon which the photographing was performed in Examples 1 to 5 are shown below.

(Photographing Conditions)

Shutter speed: Auto 93
Gain: Manual 0.0 dB
White balance: Pushset
Epi-illumination: ON
Stage transmitted illumination: OFF
Edge enhancement: ON 1.0
Gamma: OFF
Offset: OFF
Monochrome: OFF
Clean image mode: OFF
Sight compensation: OFF As an example of the photographed image, an image on photographing the pressure sensitive adhesive sheet of Example 1 is shown in FIG. 5(*a*). Sites which appear white are a concave portion. In addition, in the image of FIG. 5(a), one division of scale in the lower right in the image indicates a length of 1,000 μm.

Operation (iii): With respect to each of the digital images of the obtained four regions, automatic area measurement was performed with the same digital microscope as described above, thereby measuring the proportion of the total area of the concave portions having a shape different from other concave portions. An average value of the area proportion obtained by measuring the four regions was shown as "Proportion of total area of concave portions having shape different from other concave portions" in Table 4.

In the automatic area measurement, the attached face and the concave portion were subjected to image processing (binarization processing) to obtain a binarized image, and with respect to the obtained binarized image, an area and a perimeter of each of the concave portions were measured. Specifically, after performing automatic color separation due to a difference of illuminance of digital image between the attached face and the concave portion, a portion which could be judged as the attached face through visual inspection while confirming the digital image before the binarization by using an area confirmation function was subjected to manual color separation, and compensation was applied to perform the binarization due to the image processing. On the image processing, even if the resin layer is identical, a difference in the illuminance of the attached face on the surface (α) is occasionally generated depending upon the kind or color of the substrate which the pressure sensitive adhesive sheet to be measured has.

Accordingly, as described above, in the case where the attached face could be explicitly judged as an attached face while properly confirming the digital image before the binarization through visual inspection, the compensation was performed while considering to be the attached face according to that judgement.

The area and the perimeter of each of the concave portions existing in the region (Vs) were measured from the binarized image, and with respect to the concave portions identical with other concave portions in terms of the values of the area and perimeter, the total area of the concave portions was determined. With respect to a concave portion extending outside the range of the region (Vs), the area and the perimeter of the shape cut out by contours of the concave portion existing in the region (Vs) and a part of each side of the rectangle surrounding the region (Vs) were measured.

The proportion of the total area of the concave portions having a shape different from other concave portions on the surface (α) was calculated according to the calculation expression: [proportion of total area of concave portions having shape different from other concave portions]=[(total area of concave portions existing in region (Vs))−(total area of concave portions identical in area and perimeter with other concave portions)/(total area of concave portions existing in region (Vs))]×100.

The measurement conditions at the time of automatic area measurement are shown below. The suitable photographing conditions differ depending upon the kind or color of the substrate which the pressure sensitive adhesive sheet has, and the environment of the apparatus. Therefore, though it is needed to properly select the conditions under which the attached face can be observed favorably, as an example of the photographing conditions, the conditions upon which the photographing was performed in Examples 1 to 5 are shown below.

(Automatic Area Measurement Conditions)
Extraction mode: Illuminance (noise removal: weak)
Illuminance extraction region: Bright region
Threshold value: 0
Filling in blank: OFF
Small particle removal: OFF
Extraction region: To extract a rectangle having an area of 8.93 mm² and having a size of 3.45 mm in long side and 2.59 mm in short side by means of numerical value designation (rectangle)
Shaping of extraction region: Particle removal (removal of particles having an area of 100 μm² or less)

As an example of the image obtained by binarizing the digital image obtained in the aforementioned operation (ii) at the time of automatic area measurement, the binarized image of the pressure sensitive adhesive sheet of Example 1 is shown in FIG. 5(b). Sites which appear black are a concave portion. In addition, in the image of FIG. 5(b), one division of scale in the lower right in the image indicates a length of 1,000 μm.

As described in the aforementioned measurement conditions, the shape having an area of 100 μm² or less was not employed for the calculation of the proportion of area.

<Ratio of Attached Face Area of Surface (α) to Adherend (Attached Face Area Ratio)>

The value calculated through the following operations (i), (ii), and (iv) was considered to be the "ratio of the attached face area of the surface (α) to the adherend (attached face area ratio) in the case of attaching the surface (α) to the adherend" of the targeted pressure sensitive adhesive sheet. The measurement results of each of the Examples and Comparative Examples are shown as the "attached face area ratio" in Table 4.

Operation (i): A laminate installed in the direction shown in FIG. 4 was obtained in the same manner as the aforementioned operation (i) of the "proportion of the total area of the concave portions having a shape different from other concave portions on the surface (α)".

Operation (ii): In the region (Vs) having an area of 8.93 mm² surrounded by a rectangle of 3.45 mm in long side and 2.59 mm in short side that was arbitrarily selected from the side of the translucent adherend 100 of the laminate obtained in the operation (i), an interface between the smooth face 100a of the translucent adherend 100 and the surface (α) 12a of the resin layer was photographed under the following photographing conditions from the W direction of FIG. 4 by using the aforementioned digital microscope (manufactured by Keyence Corporation, a product name "Digital Microscope VHX-5000", high-resolution Zoom Lens VHX-ZST (100×), magnification: 100 times), thereby obtaining a digital image of the selected region (Vs). In the region (Vs), digital images in four different regions were acquired.

Operation (iv): With respect to each of the obtained digital images four regions, automatic area measurement was performed with the aforementioned digital microscope, thereby measuring the proportion of the attached face area. An average value of the proportion of the attached face area obtained by measuring the four regions is shown as "Proportion of attached face area" in Table 4.

In the automatic area measurement, the attached face and the concave portion were subjected to image processing (binarization processing) to obtain a binarized image. Specifically, after performing automatic color separation due to a difference of illuminance of digital image between the attached face and the concave portion, a portion which could be judged as the attached face through visual inspection while confirming the digital image before the binarization by using an area confirmation function was subjected to manual color separation, and compensation was applied to perform the binarization due to the image processing. On the image processing, even if the resin layer is identical, a difference in the illuminance of the attached face on the surface (α) is occasionally generated depending upon the kind or color of the substrate which the pressure sensitive adhesive sheet to be measured has. Accordingly, in the case where the attached face could be explicitly judged as an attached face while properly confirming the digital image before the binarization through visual inspection, the compensation was performed while considering to be the attached face according to that judgement. In addition, with respect to a flat face extending outside the range of the region (Vs), only the area of the part existing in the region (Vs) was measured.

Then, an area S of the attached face coming into contact with the smooth face of the translucent adherend in the whole area of the selected region (Vs) was determined based on the binarized image, and an area ratio of the attached face to the translucent adherend in the selected region (Vs) was determined based on the calculation expression: [area ratio (%) of attached face]=S/(whole area of the selected region (Vs))×100.

<Each Area and Maximum Area of Flat Face, and Total Area of Flat Face>

The values calculated through the following operations (v) to (vii) were considered to be the "total area of flat face" and "maximum area of flat face" of the surface (α) of the pressure sensitive adhesive sheet, respectively. The measurement results of each of the Examples and Comparative Examples are shown in Table 4.

Operation (v): In order to exclude any influence, such as undulations of the pressure sensitive adhesive sheet, etc., a double-sided pressure sensitive adhesive tape was applied onto a smooth face of the aforementioned translucent adherend that is a smooth adherend, to attach the surface of the substrate of the pressure sensitive adhesive sheet as the measuring object, and the following operations were then performed.

Operation (vi): In the region (V) having an area of 8.93 mm² surrounded by a rectangle of 3.45 mm in long side and 2.59 mm in short side that was arbitrarily selected on the surface (α) of the resin layer of the pressure sensitive adhesive sheet produced in each of the Examples and Comparative Examples, by using a digital microscope (manufactured by Keyence Corporation, a product name "Digital Microscope VHX-5000", high-resolution Zoom Lens VHX-ZST (100×), magnification: 100 times), the focus was moved from the upper portion of a site which had been judged to be flat through visual inspection in success from the side of the surface (α) (direction rectangular to the substrate), and a portion which was first in focus was photographed as the flat face, thereby photographing a digital image of the region (V). As for the region (V), digital images in four different regions were acquired. The suitable photographing conditions differ depending upon the kind or color of the substrate which the pressure sensitive adhesive sheet has, and the environment of the apparatus. Therefore, though it is needed to properly select the conditions under which the flat face can be observed favorably, the conditions which are common among the respective Examples are shown below.

(Photographing Conditions)
  Epi-illumination: ON
  Stage transmitted illumination: OFF
  Switching of illumination: Coaxial epi-illumination
  Edge enhancement: OFF As an example of the photographed image, an image on photographing the pressure sensitive adhesive sheet of Example 1 is shown in FIG. 6(a). Sites which appear white are a flat portion. In addition, in the image of FIG. 6(a), one division of scale in the lower right in the image indicates a length of 1,000 μm.

Operation (vii): With respect to each of the digital images of the obtained four regions, automatic area measurement was performed with the same digital microscope, thereby measuring an area of each flat face. Then, a maximum area of the flat face and a total area of the flat face were calculated for every region. A maximum area of the flat face and an average value of the total area of the flat face obtained by measuring the four regions were shown as "Maximum area of flat face" and "Total area of flat face" in Table 4.

In the automatic area measurement, the flat face and the concave portion were subjected to image processing to perform binarization, and measurement of the numerical values (areas) of the obtained binarized image was performed to measure the areas of the flat face and the concave portion. In the case where plural flat faces existed, the area of each of the flat faces was measured. Specifically, after performing automatic color separation due to a difference of illuminance of digital image between the flat face and the concave portion, a part which could be judged as the flat face through visual inspection while confirming the original digital image by an area confirmation function was subjected to manual color separation, and compensation was applied to perform the binarization due to the image processing.

In the case where whether or not the flat face existed could not be judged through visual inspection of the image, a translucent adherend having a smooth surface was manually attached on the surface (α) of the resin layer by using a squeegee without applying a load as far as possible, the surface (α) of the resin layer was photographed through the smooth face of the translucent adherend from the W direction in FIG. 4, and a part of the surface (α) of the resin layer attached to the smooth surface of the translucent adherend was judged as the flat face.

The conditions of the automatic area measurement are as follows.

In the automatic area measurement, the flat face and the concave portion of the digital image obtained in the operation (vi) were subjected to image processing (binarization processing) to obtain a binarized image, and with respect to the obtained binarized image, an area of the flat face was measured. In the case where plural flat faces existed, the area of each of the flat faces was measured. In addition, with respect to a flat face extending outside the range of the region (V), only the area of the part existing in the region (V) was measured.

Specifically, after performing automatic color separation due to a difference of illuminance of digital image between the flat face and the concave portion, a part which could be judged as the flat face through visual inspection while confirming the digital image before the binarization by using an area confirmation function was subjected to manual color separation, and compensation was applied to perform the binarization due to the image processing. On the image processing, even if the resin layer is identical, a difference in the illuminance of the attached face on the surface (α) is occasionally generated depending upon the kind or color of the substrate which the pressure sensitive adhesive sheet to be measured has. Accordingly, in the case where the flat face could be explicitly judged as an attached face while properly confirming the digital image before the binarization through visual inspection, the compensation was performed while considering to be the flat face according to that judgement.

The measurement conditions at the time of automatic area measurement are shown below. The suitable photographing conditions differ depending upon the kind or color of the substrate which the pressure sensitive adhesive sheet has, and the environment of the apparatus. Therefore, though it is needed to properly select the conditions under which the attached face can be observed favorably, the conditions which are common among the respective Examples are shown below.

(Automatic Area Measurement Conditions)

Extraction mode: Illuminance (noise removal: weak)

Extraction region: To extract a rectangle having an area of 8.93 mm² and having a size of 3.45 mm in long side and 2.59 mm in short side by means of numerical value designation (rectangle)

Shaping of extraction region: Particle removal (removal of particles having an area of 100 μm² or less)

As an example of the image obtained by binarizing the digital image obtained in the aforementioned operation (vi) at the time of automatic area measurement, the binarized image of the pressure sensitive adhesive sheet of Example 1 is shown in FIG. 6(b). Sites which appear black are a concave portion.

As described in the aforementioned measurement conditions, the shape having an area of 100 μm² or less was not employed for the calculation of the proportion of area.

With respect to the pressure sensitive adhesive sheet produced in each of the Examples and Comparative Examples, the "air escape property", the "appearance", the "folding attaching property", and the "pressure sensitive adhesive strength" were evaluated. The results are shown in Table 4.

<Air Escape Property>

The pressure sensitive adhesive sheet in a size of 50 mm in length and 50 mm in width was attached to a melamine-coated plate as an adherend so as to generate air accumulation. After press-attaching with a squeegee, the presence or absence of the air accumulation was observed, and the air escape property of each of the pressure sensitive adhesive sheets was evaluated according to the following criteria.

A: The air accumulation disappeared, and the air escape property was excellent.

F: The air accumulation remained, and the air escape property was inferior.

<Appearance>

The pressure sensitive adhesive sheet in a size of 50 mm in length and 50 mm in width was attached to an acrylic painted plate (a product name: "Acrylic Painted (one face/white) SPCC-SD φ5-1", size: 70 mm in width×150 mm in length×0.4 mm in thickness, manufactured by Paltec Test Panels Co., Ltd.) as an adherend. After press-attaching with a squeegee, the appearance was observed from the surface side of the substrate, and the appearance of each of the pressure sensitive adhesive sheets was evaluated according to the following criteria.

A: The poor appearance to be caused due to unevennesses on the surface (α) of the resin layer was not confirmed.

F: The poor appearance to be caused due to unevennesses on the surface (α) of the resin layer was confirmed.

<Folding Attaching Property>

After cutting the pressure sensitive adhesive sheet produced in each of the Examples and Comparative Examples in a size of 25 mm in width×50 mm in length, an acrylic painted plate (a product name: "Acrylic Painted (one face/white) SPCC-SD φ5-1", size: 70 mm in width×150 mm in length×0.4 mm in thickness, manufactured by Paltec Test Panels Co., Ltd.) was press-attached to the surface (α) of the resin layer of the pressure sensitive adhesive sheet under an environment at 23° C. and 50% RH (relative humidity) with a squeeze applied with a load of 30 N while folding the pressure sensitive adhesive sheet from the back surface on the acrylic painting side of the acrylic painted plate toward the front surface, followed by allowing to stand under the same environment for 24 hours.

At the time of attaching the pressure sensitive adhesive sheet, the pressure sensitive adhesive sheet was attached in such a manner that it was folded from a site of 35 mm from an edge in the lengthwise direction thereof (see FIG. 7). After allowing to stand for 24 hours, the appearance of each of the pressure sensitive adhesive sheets was evaluated according to the following criteria.

A: Neither lifting nor peeling of the folded portion from the adherend was confirmed.

B: Lifting of the folded portion from the adherend was slightly confirmed.

C: Lifting of the folded portion from the adherend was confirmed.

D: Peeling of the folded portion from the adherend was confirmed.

<Pressure Sensitive Adhesive Strength>

After cutting the pressure sensitive adhesive sheet produced in each of the Examples and Comparative Examples in a size of 25 mm in width×300 mm in length, the surface (α) of the resin layer of the pressure sensitive adhesive sheet was attached to the melamine coated side of a melamine painted plate (a product name: "Melamine Painted (one face/white) SPCC-SD φ5-1", size: 70 mm in width×150 mm in length×0.4 mm in thickness, manufactured by Paltec Test Panels Co., Ltd.) under an environment at 23° C. and 50% RH (relative humidity), followed by allowing to stand under the same environment for 24 hours. After allowing to stand, the pressure sensitive adhesive strength of each of the pressure sensitive adhesive sheets was measured by the 180° peeling method at a drawing speed of 300 mm/min in conformity with JIS Z0237:2000.

TABLE 4

| | Substrate | | | | Resin layer | | | |
|---|---|---|---|---|---|---|---|---|
| | | | Bending | | | Concave portion on surface (α) | | |
| | | | 10% | stress | Young's | | | |
| | Kind of sub-strate No. | Thick-ness [μm] | elongation strength in the MD direction [N/15 mm] | coefficient k in the MD direction [N · mm] | modulus E in the MD direction [MPa] | Require-ment (I) | Require-ment (II) | Maximum value of height difference [μm] | Mass retention rate [% by mass] |
| Example 1 | 1 | 50 | 14 | 0.09 | 701 | A | A | 14.5 | 11.2 |
| Example 2 | 2 | 50 | 19 | 0.18 | 1445 | A | A | 15.2 | 11.9 |
| Example 3 | 3 | 98 | 22 | 0.52 | 555 | A | A | 15.9 | 10.5 |

TABLE 4-continued

| | | | | | | | | | | |
|---|---|---|---|---|---|---|---|---|---|---|
| Example 4 | 4 | 90 | 31 | 0.81 | 1114 | A | A | 13.1 | 10.9 |
| Example 5 | 5 | 50 | 80 | 0.52 | 4171 | A | A | 14.2 | 12.7 |
| Example 6 | 6 | 50 | 79 | 0.47 | 3760 | A | A | 16.7 | 9.2 |
| Example 7 | 7 | 38 | 62 | 0.23 | 4163 | A | A | 13.6 | 11.3 |
| Example 8 | 8 | 50 | 83 | 0.54 | 4301 | A | A | 16.8 | 9.8 |
| Example 9 | 9 | 75 | 120 | 1.65 | 3906 | A | A | 13.8 | 12.3 |
| Example 10 | 10 | 100 | 170 | 4.02 | 4022 | A | A | 14.6 | 12.2 |
| Example 11 | 11 | 125 | 209 | 7.66 | 3920 | A | A | 15.3 | 10.1 |
| Comparative Example 1 | 12 | 188 | 308 | 22.02 | 3313 | A | A | 15.8 | 9.5 |
| Comparative Example 2 | 1 | 50 | 14 | 0.09 | 701 | A | F | 42.5 | 14.4 |

| | Resin layer | | | | Evaluation items of pressure sensitive adhesive sheet | | | |
|---|---|---|---|---|---|---|---|---|
| | Proportion of total area of concave portions having shape different from other concave portions [%] (*1) | Attached face area ratio [%] (*2) | Total area of flat faces [mm$^2$] (*3) | Maximum area of flat faces [mm$^2$] (*3) | Air escape property | Appearance | Folding attaching property | Pressure sensitive adhesive strength [N/25 mm] |
| Example 1 | 100 | 71.0 | 5.40 | 3.60 | A | A | A | 7.7 |
| Example 2 | 100 | 71.5 | 5.54 | 2.39 | A | A | A | 10.0 |
| Example 3 | 100 | 71.0 | 5.76 | 2.22 | A | A | A | 8.3 |
| Example 4 | 100 | 68.0 | 5.36 | 2.10 | A | A | A | 12.2 |
| Example 5 | 100 | 71.5 | 5.71 | 2.42 | A | A | B | 7.6 |
| Example 6 | 100 | 73.5 | 6.26 | 2.75 | A | A | B | 7.3 |
| Example 7 | 100 | 67.5 | 5.91 | 2.72 | A | A | B | 7.9 |
| Example 8 | 100 | 70.0 | 5.57 | 2.48 | A | A | B | 7.7 |
| Example 9 | 100 | 69.5 | 5.98 | 1.02 | A | A | C | 6.1 |
| Example 10 | 100 | 68.5 | 6.10 | 2.68 | A | A | C | 3.5 |
| Example 11 | 100 | 68.5 | 6.11 | 3.67 | A | A | C | 2.5 |
| Comparative Example 1 | 100 | 64.5 | 5.99 | 2.78 | A | A | D | 1.4 |
| Comparative Example 2 | 100 | 72.0 | 6.36 | 3.29 | A | F | A | 11.0 |

(*1): Proportion of the total area of concave portions having a different shape from other concave portions observed on attaching the surface (α) of the resin layer to the adherend
(*2): Area ratio of the attached part (attached face) existing in the region (Vs) of 8.93 mm$^2$ on attaching the surface (α) of the resin layer to the adherend
(*3): Area of flat faces existing in the region (Vs) of 8.93 mm$^2$ in the case where the surface (α) of the resin layer is not attached to the adherend From Table 4, the pressure sensitive adhesive sheets produced in Examples 1 to 11 were confirmed to have the value of the 10% elongation strength of 250 N/15 mm or less and the value of the bending stress coefficient k of 20 N·mm or less of the used substrate and to satisfy the aforementioned requirements (I) and (II) regarding the shape of the concave portion on the surface (α), and were favorable in all of the air escape property, the appearance, and the folding attaching property.

In all of the pressure sensitive adhesive sheets produced in Examples 1 to 11 and Comparative Examples 1 to 2, on observing the inside of the region (V) on the surface (α) with the aforementioned digital microscope (magnification: 100 times), it was confirmed that the shape of the concave portions is irregular, the positions at which the plural concave portions exist do not have any periodicity, and the shape of the flat faces is irregular, too.

In addition, in all of the pressure sensitive adhesive sheets produced in Examples 1 to 11 and Comparative Examples 1 to 2, it was confirmed that the flat face having an area such that a region surrounded by a circle having a diameter of 100 μm is selectable exists in the region (Vs) on the surface (α).

In addition to the above, in all of the pressure sensitive adhesive sheets produced in Examples 1 to 11 and Comparative Example 1, it was confirmed that one or more of the concave portions existing in the region (U) on the surface (α) of the resin layer extend toward any edge of the square having an edge length of 1 mm that is a boundary line of the region (U) and further have a shape continuously extending into the other region (U') surrounded by a square having an edge length of 600 μm, which is adjacent to the region (U). This can also be, for example, confirmed from the perspective image of the surface (α) of the resin layer of FIG. 8(b).

FIG. 8 is an image on observing the pressure sensitive adhesive sheet produced in Example 4 with a scanning electron microscope, in which FIG. 8(a) is a cross sectional image of the pressure sensitive adhesive sheet, and FIG. 8(b) is a perspective image of the surface (α) of the resin layer of the pressure sensitive adhesive sheet.

While the image shown in FIG. 8 is an image of the surface (α) of the resin layer of the pressure sensitive adhesive sheet produced in Example 4, in the surface (α) of the resin layer of the pressure sensitive adhesive sheet in other Examples, the positions at which the plural concave portions exist do not have any periodicity, and the shape of the flat face on the surface (α) is irregular, too.

On the other hand, in the pressure sensitive adhesive sheet produced in Comparative Example 1, the value of the 10% elongation strength of the used substrate was more than 260 N/15 mm, and the bending stress coefficient k thereof was more than 20 N·mm, and therefore, there were revealed the results that the folding attaching property and the pressure sensitive adhesive strength are remarkably inferior.

In addition, in the pressure sensitive adhesive sheet produced in Comparative Example 2, it was not confirmed that one or more of the aforementioned concave portions exist, so that there were revealed the results that the appearance of the pressure sensitive adhesive sheet of Comparative Example 2 is remarkably inferior.

FIG. 9 is an image on observing the pressure sensitive adhesive sheet produced in Comparative Example 2 with a scanning electron microscope and is a perspective image of the surface (α) of the resin layer of the pressure sensitive adhesive sheet. Like the image shown in FIG. 9, in the surface (α) of the resin layer of the pressure sensitive adhesive sheet produced in Comparative Example 2, the formation of a concave portion was not found in the region (U) on the surface (α) of the resin layer.

INDUSTRIAL APPLICABILITY

The pressure sensitive adhesive sheet that is one embodiment of the present invention is favorable in all of the air escape properties, the appearance, and the folding attaching property, and therefore, it can be suitably used for painting-alternate tapes, marking films, and vehicle attachment tapes. In particular, in view of the matter that the pressure sensitive adhesive sheet that is one embodiment of the present invention is favorable in the appearance and the folding attaching property, it is useful as a tape to be used on attaching to a shape face having a folded portion of a vehicle or the like.

REFERENCE SIGNS LIST 1a, 1b: Pressure sensitive adhesive sheet
11: Substrate
12: Resin Layer
12a: Surface (α)
12b: Surface (β)
(X): Resin part (X)
(Y): Particle Part (Y)
(Xβ): Layer (Xβ) mainly containing the resin part (X)
(Xα): Layer (Xα) mainly containing the resin part (X)
(Y1): Layer (Y1) containing the particle part (Y) in an amount of 15% by mass or more
13, 130, 131, 132: Concave portion
13a: Cross line
14: Release material
15: Flat face
50, 501, 502, 503, 504: Square having an edge length of 600 μm
100: Translucent adherend
100a: Smooth face
101: Attached part to adherend (attached face)
102: Non-attached part to adherend
201: Acrylic painted plate
202: Pressure sensitive adhesive sheet test piece for folding attaching property test

The invention claimed is:

1. A pressure sensitive adhesive sheet, comprising:
a substrate; and
a resin layer provided on the substrate and comprising a resin part (X) comprising a resin as a main component, and a particle part (Y) consisting of fine particles having a mean particle size of 0.01 to 100 μm,
wherein:
the fine particles comprise at least one selected from the group consisting of silica particles comprising 85 to 100% by mass of silica, metal oxide particles, and smectite particles,
at least a surface (α) of the resin layer on a side opposite to a side on which the substrate is provided has pressure sensitive adhesiveness,
the substrate has a Young's modulus in a MD direction of 3,000 MPa or less,
a bending stress coefficient k in the MD direction of the substrate is 20 N·mm or less, and a 10% elongation strength in the MD direction of the substrate is 260 N/15 mm or less,
a plurality of concave portions having a height difference of 0.5 μm or more at maximum exists in a region (P) surrounded by a square having an edge length of 5 mm that is arbitrarily selected on the surface (α) of the resin layer, and
at least one of the concave portions exists in a region (U) surrounded by a square having an edge length of 600 μm that is arbitrarily selected on the surface (α).

2. The pressure sensitive adhesive sheet according to claim 1, wherein the Young's modulus in the MD direction of the substrate is 2,000 MPa or less.

3. The pressure sensitive adhesive sheet according to claim 1, wherein the 10% elongation strength in the MD direction of the substrate is 50 N/15 mm or less.

4. The pressure sensitive adhesive sheet according to claim 1, wherein the resin layer comprises 3 to 90% by mass of the fine particles.

5. The pressure sensitive adhesive sheet according to claim 1, wherein a volume average secondary particle diameter of the fine particles is 1 to 70% of the thickness of the resin layer.

6. The pressure sensitive adhesive sheet according to claim 1, wherein a volume average secondary particle diameter of the fine particles is 0.5 to 10 μm.

7. The pressure sensitive adhesive sheet according to claim 1, wherein the resin layer is a multilayer structure in which a layer (Xβ) mainly comprising the resin part (X), a layer (Y1) comprising the particle part (Y) in an amount of 15% by mass or more, and a layer (Xα) mainly comprising the resin part (X) are laminated in this order from the side on which the substrate is provided.

8. The pressure sensitive adhesive sheet according to claim 1, wherein the shape of the concave portions is irregular.

9. The pressure sensitive adhesive sheet according to claim 1, wherein in a planar view of the surface (α) of the resin layer on attaching the surface (α) to an adherend, in a region (Vs) having an area of 8.93 mm² surrounded by a rectangle of 3.45 mm in long side and 2.59 mm in short side that is arbitrarily selected on the surface (α), a proportion of the total area of the concave portions having a shape different from other concave portions existing in the region (Vs) is 95.0% or more relative to the whole area of all of the concave portions existing in the region (Vs).

10. The pressure sensitive adhesive sheet according to claim 1, wherein a shape of a flat face existing on the surface (α) observed from the side of the surface (α) of the resin layer is irregular.

11. The pressure sensitive adhesive sheet according to claim 1, wherein on attaching the surface (α) of the resin layer to an adherend, an area ratio of the attached face to the adherend is 10 to 95%.

12. The pressure sensitive adhesive sheet according to claim 1, wherein in a planar view of the surface (α) of the resin layer, the whole area of flat faces existing in a region (V) having an area of 8.93 mm² surrounded by a rectangle of 3.45 mm in long side and 2.59 mm in short side that is arbitrarily selected on the surface (α) is 1.0 mm² or more.

13. The pressure sensitive adhesive sheet according to claim 1, wherein in a planar view of the surface (α) of the resin layer, at least one flat face having an area within which a region surrounded by a circle having a diameter of 100 μm is selectable exists in a region (V) having an area of 8.93 mm² surrounded by a rectangle of 3.45 mm in long side and 2.59 mm in short side.

14. The pressure sensitive adhesive sheet according to claim 1, wherein in a planar view of the surface (α) of the resin layer, at least one flat face having an area of 0.1 mm² or more exists in a region (V) having an area of 8.93 mm² surrounded by a rectangle of 3.45 mm in long side and 2.59 mm in short side.

15. The pressure sensitive adhesive sheet according to claim 1, wherein the resin comprises a pressure sensitive adhesive resin.

16. The pressure sensitive adhesive sheet according to claim 1, which is suitable for painting-alternate tapes, marking films, or vehicle attachment tapes.

17. A method for producing the pressure sensitive adhesive sheet according to claim 1, which comprises:
   forming a coating film (x') formed by a composition (x) comprising a resin as a main component and a coating film (y') formed by a composition (y) comprising the fine particles in an amount of 15% by mass or more; and
   drying the coating film (x') and the coating film (y') simultaneously.

18. The method according to claim 17,
   wherein the forming comprises forming, on a release material or a substrate having a bending stress coefficient k in the MD direction of 20 N·mm or less and a 10% elongation strength in the MD direction of 260 N/15 mm or less, a coating film (xβ') formed by a composition (xβ) comprising a resin as a main component, a coating film (y') formed by a composition (y) comprising the fine particles in an amount of 15% by mass or more, and a coating film (xα') formed by a composition (xα) comprising a resin as a main component, by laminating in this order; and
   wherein the drying comprises drying the coating film (xβ'), the coating film (y'), and the coating film (xα') simultaneously.

* * * * *